US005841658A

United States Patent [19]

Bouchard

[11] Patent Number: 5,841,658

[45] Date of Patent: Nov. 24, 1998

[54] BULK MAIL ENTIRE PREPARATION METHOD AND KIT

[76] Inventor: Paul W. Bouchard, R.R. 2 Box 169, Orrington, Me. 04474

[21] Appl. No.: 363,703

[22] Filed: Dec. 23, 1994

[51] Int. Cl.[6] ............................ G07B 17/02; G06F 19/00

[52] U.S. Cl. ................................ 364/464.16; 364/464.2; 364/478.07; 364/478.11

[58] Field of Search .............................. 364/464.02, 478, 364/464.16, 464.11, 464.2, 478.01, 478.07, 478.11, 478.12; 209/584, 900; 382/101

[56] References Cited

U.S. PATENT DOCUMENTS

| | | | |
|---|---|---|---|
| 3,557,949 | 1/1971 | Washington | 209/565 |
| 4,167,476 | 9/1979 | Jackson | 209/3.3 |
| 4,395,031 | 7/1983 | Gruber et al. | 270/52.29 |
| 4,601,394 | 7/1986 | Hunter | 364/478 X |
| 4,627,540 | 12/1986 | Takeda | 209/584 X |
| 4,731,741 | 3/1988 | Allen | 364/518 |
| 4,985,842 | 1/1991 | Ward | 209/584 X |
| 4,997,337 | 3/1991 | Trimble | 414/790.4 |
| 5,101,981 | 4/1992 | Carbone et al. | 209/548 |
| 5,216,620 | 6/1993 | Sansone | 364/464.03 X |
| 5,264,665 | 11/1993 | Delfer, III | 364/484.03 X |
| 5,292,008 | 3/1994 | Sansone et al. | 209/584 |
| 5,329,102 | 7/1994 | Sansone | 209/584 X |
| 5,388,049 | 2/1995 | Sansone et al. | 364/464.02 |
| 5,419,440 | 5/1995 | Picoult | 209/584 X |
| 5,446,667 | 8/1995 | Oh et al. | 364/464.02 |
| 5,459,670 | 10/1995 | Johnson et al. | 364/464.03 X |
| 5,470,427 | 11/1995 | Mikel et al. | 209/900 X |
| 5,600,565 | 2/1997 | Wagner et al. | 364/478.07 |

*Primary Examiner*—Edward R. Cosimano

[57] ABSTRACT

This invention involves a method of automatically converting a random address file into a file with address entries in bulk mail order by package and sack groups, including postal endorsements used in a unique manner which indicates by a mere glance where mailpiece package groups separate, as well as eliminating the need for "D", "3", etc. stickers. It also produces a mailpiece count report which facilitates mailing statement preparation and postage calculation, and a mail sack label report which shows what must appear on each mail sack label needed for the mailing. It also permits the assembling of a kit which, when used by an inexperienced person with mailpieces, permits the easy preparation of a complete bulk mailing meeting postal verification standards.

12 Claims, 17 Drawing Sheets

Microfiche Appendix Included
(1 Microfiche, 24 Pages)

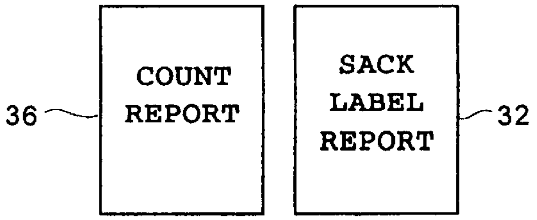
Fig. 2
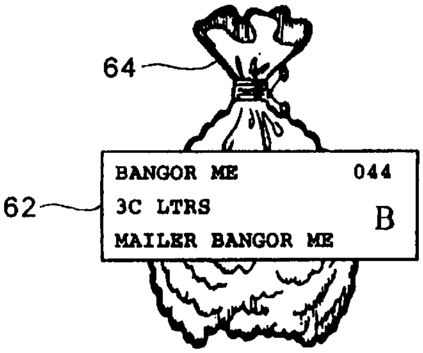
Fig. 5
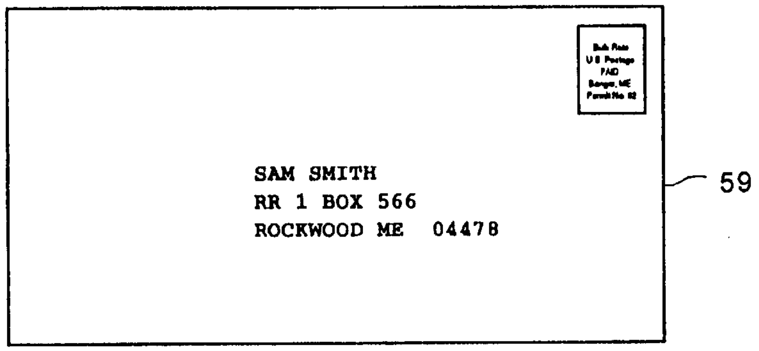
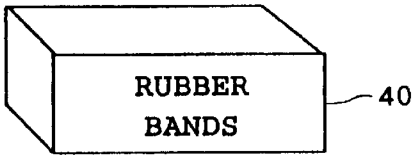
Fig. 4
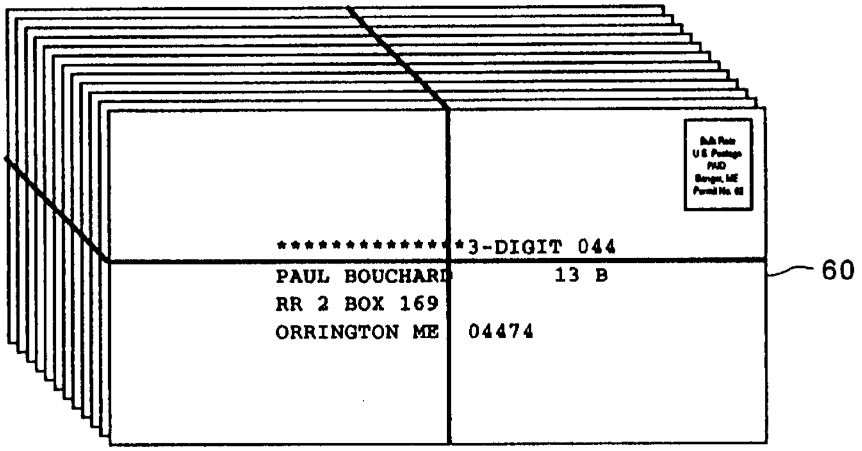

38

Statement of Mailing with Permit Imprints
Third-Class Mail (Regular Rates Only)

UNITED STATES POSTAL SERVICE

MAILER: Complete all items by typewriter, pen, or indelible pencil. Prepare in duplicate if you need a receipt.

Mailer's Information

| | | | | |
|---|---|---|---|---|
| Post Office of Mailing | | Date | Processing Category<br>[ ] Letters (DMM 128.2)<br>[ ] Flats (DMM 128.31)<br>[ ] Automation-Compatible Flats (DMM 128.32)<br>[ ] Machinable Parcels (DMM 128.4)<br>[ ] Irregular Parcels (DMM 128.5)<br>[ ] Outside Parcels (DMM 128.6) | USPS Authorized Mailing ID Code(s) |
| Permit No. | Federal Agency Cost Code | Mailing Statement Seq. No. | | |
| Permit Holder's Name & Address (Include ZIP Code) | Telephone Number | Receipt No. | | |
| | | No. Sacks / No. Trays | No. Pallets / No. Other | |
| | | Weight of a Single Piece ___ . ___ ___ ___ ___ pounds | | |
| | | Total Pieces in Mailing | Total Weight of Mailing | Sacking Based on<br>[ ] 125 pcs. [ ] 15 lbs. [ ] Both (DMM 641) |
| Name & Address of Individual or Organization for Which Mailing is Prepared (If other than the permit holder) | | Name and Address of Mailing Agent (If other than the permit holder) | | Check All That Apply<br>[ ] Centralized Postage Payment<br>[ ] Plant Loaded to<br>[ ] Plant Verified Drop Shipment to<br>[ ] BMAU Entry at<br>[ ] Orig. [ ] Dest. A/O ZIP ______<br>[ ] Orig. [ ] Dest. SCF 3D ZIP ______<br>[ ] Orig. [ ] Dest. BMC ______ |

Postage Computation

| | | | |
|---|---|---|---|
| • For bulk mailings of **automation-compatible letter-size** pieces (see DMM 521), go to **Part A** on the reverse of this form. | Postage (From Reverse Side) ▶ | Part A | $ |
| • For bulk mailings of **non-automation compatible letter-size** pieces (see DMM 128.2) weighing **.2067 lb. (3.3067 oz.)** or less, go to **Part B** on the reverse of this form. | | Part B | $ |
| • For bulk mailings of **non letter-size** pieces (see DMM 128.2) weighing .2067 lb. (3.3067 oz.) or less, go to **Part C** on the reverse of this form. | | Part C | $ |
| • For bulk mailings of all pieces weighing **more than .2067 lb. (3.3067 oz.)** but **less than 1.0 lb. (16.0 oz.)**, go to **Part D** on the reverse of this form. | | Part D | $ |
| Single-Piece Rate [ ] or Additional Postage Payment (State reasons for Additional Postage) | No. Pieces | Rate/Piece $ . ___ = | $ |
| Is applicable bulk per piece rate affixed to each piece? (Form 3602-PC required) [ ] Yes [ ] No | | **Total Postage** ——▶ | $ |

Certification

The signature of a mailer certifies that it will be liable for and agrees to pay, subject to appeals prescribed by postal laws and regulations, any revenue deficiencies assessed on this mailing. If this form is signed by an agent, the agent certifies that it is authorized to sign this statement, that the certification binds the agent and the mailer and both the mailer and the agent will be liable for and agree to pay any deficiencies.

The submission of a false, fictitious or fraudulent statement may result in imprisonment of up to 5 years and a fine of up to $10,000 (18 USC 1001). In addition, a civil penalty of up to $5,000 and an additional assessment of twice the amount falsely claimed may be imposed (31 USC 3802).

I hereby certify that all information furnished on this form is accurate and truthful, and that this material presented qualifies for the rates of postage claimed.

| | |
|---|---|
| Signature of Permit Holder or Agent (Both principal and agent are liable for any postage deficiency incurred) | Telephone Number |

USPS Use Only

| | | | |
|---|---|---|---|
| Single-Piece Weight ___ pounds | Are the figures at left adjusted from mailer's entries? [ ] Yes [ ] No<br>If "Yes," Reason | | |
| Total Pieces / Total Weight | | | |
| Total Postage | | | |
| Check One [ ] Verif. Not Scheduled / Present Verification Per [ ] Verif. as Scheduled | Date Mailer Notified | Contact | By (Initials) |
| I CERTIFY that this mailing has been inspected concerning: 1) eligibility for the rate of postage claimed; 2) proper preparation (and presort where required); 3) proper completion of the statement of mailing; and 4) payment of the necessary annual fee. | | | Round Stamp (Required) |
| Signature of Weigher | Time AM PM | | |

PS Form 3602-R, June 1992 — Financial Document - Forward to Finance Office

Fig. 6

38

Form 3602-R — Third-Class Regular Rate — Permit Imprint

Postage Computation — Bulk Rates

Automation-Compatible Letter (DMM 520)

| Entry Discount (If Any) | Presort/ Automation Discounts | Net Rate | Count (Pcs/Lbs) | Charge |
|---|---|---|---|---|
| None | Saturation W/S | .124 × | pcs. = | $ |
| | Carrier Route | .131 × | pcs. = | $ |
| | 5-Digit Barcoded | .146 × | pcs. = | $ |
| | 3-Digit Barcoded | .164 × | pcs. = | $ |
| | 3/5-Digit ZIP + 4 | .161 × | pcs. = | $ |
| | 3/5-Digit Presort | .165 × | pcs. = | $ |
| | Basic ZIP + 4 Barcoded | .179 × | pcs. = | $ |
| | Basic ZIP + 4 | .189 × | pcs. = | $ |
| | Basic | .198 × | pcs. = | $ |
| BMC Entry | Saturation W/S | .112 × | pcs. = | $ |
| | Carrier Route | .119 × | pcs. = | $ |
| | 5-Digit Barcoded | .134 × | pcs. = | $ |
| | 3-Digit Barcoded | .142 × | pcs. = | $ |
| | 3/5-Digit ZIP + 4 | .149 × | pcs. = | $ |
| | 3/5-Digit Presort | .153 × | pcs. = | $ |
| | Basic ZIP + 4 Barcoded | .167 × | pcs. = | $ |
| | Basic ZIP + 4 | .177 × | pcs. = | $ |
| | Basic | .186 × | pcs. = | $ |
| SCF Entry | Saturation W/S | .107 × | pcs. = | $ |
| | Carrier Route | .114 × | pcs. = | $ |
| | 5-Digit Barcoded | .129 × | pcs. = | $ |
| | 3-Digit Barcoded | .137 × | pcs. = | $ |
| | 3/5-Digit ZIP + 4 | .144 × | pcs. = | $ |
| | 3/5-Digit Presort | .148 × | pcs. = | $ |
| | Basic ZIP + 4 Barcoded | .162 × | pcs. = | $ |
| | Basic ZIP + 4 | .172 × | pcs. = | $ |
| | Basic | .181 × | pcs. = | $ |
| DDU Entry | Saturation W/S | .102 × | pcs. = | $ |
| | Carrier Route | .109 × | pcs. = | $ |

Total – Part A (Carry to front of form) $

Check one: [ ] Automation-Compatible Flat (DMM 522) [ ] Other Nonletter – .2067 lb. (3.3067 oz.) or less

| Entry Discount (If Any) | Presort/ Automation Discounts | Net Rate | Count (Pcs/Lbs) | Charge |
|---|---|---|---|---|
| None | Saturation W/S | .127 × | pcs. = | $ |
| | 125 pc W/S | .137 × | pcs. = | $ |
| | Carrier Route | .142 × | pcs. = | $ |
| | 3/5-Digit ZIP + 4 Barcoded* | .170 × | pcs. = | $ |
| | 3/5-Digit Presort | .187 × | pcs. = | $ |
| | Basic ZIP + 4 Barcoded* | .208 × | pcs. = | $ |
| | Basic | .233 × | pcs. = | $ |
| BMC Entry | Saturation W/S | .115 × | pcs. = | $ |
| | 125-pc W/S | .125 × | pcs. = | $ |
| | Carrier Route | .130 × | pcs. = | $ |
| | 3/5-Digit ZIP + 4 Barcoded* | .158 × | pcs. = | $ |
| | 3/5-Digit Presort | .175 × | pcs. = | $ |
| | Basic ZIP + 4 Barcoded* | .196 × | pcs. = | $ |
| | Basic | .221 × | pcs. = | $ |
| SCF Entry | Saturation W/S | .110 × | pcs. = | $ |
| | 125-pc W/S | .120 × | pcs. = | $ |
| | Carrier Route | .125 × | pcs. = | $ |
| | 3/5-Digit ZIP + 4 Barcoded* | .153 × | pcs. = | $ |
| | 3/5-Digit Presort | .170 × | pcs. = | $ |
| | Basic ZIP + 4 Barcoded* | .191 × | pcs. = | $ |
| | Basic | .216 × | pcs. = | $ |
| DDU Entry | Saturation W/S | .105 × | pcs. = | $ |
| | 125-pc W/S | .115 × | pcs. = | $ |
| | Carrier Route | .120 × | pcs. = | $ |

*Available only for Automation-Compatible Flats (DMM 522)

Total – Part C (Carry to front of form) $

Non-Automation-Compatible Letter .2067 lb. (3.3067 oz.) or less

| Entry Discount (If Any) | Presort/ Automation Discounts | Net Rate | Count (Pcs/Lbs) | Charge |
|---|---|---|---|---|
| None | Saturation W/S | .124 × | pcs. = | $ |
| | Carrier Route | .131 × | pcs. = | $ |
| | 3/5-Digit Presort | .165 × | pcs. = | $ |
| | Basic | .198 × | pcs. = | $ |
| BMC Entry | Saturation W/S | .112 × | pcs. = | $ |
| | Carrier Route | .119 × | pcs. = | $ |
| | 3/5-Digit Presort | .153 × | pcs. = | $ |
| | Basic | .186 × | pcs. = | $ |
| SCF Entry | Saturation W/S | .107 × | pcs. = | $ |
| | Carrier Route | .114 × | pcs. = | $ |
| | 3/5 Digit Presort | .148 × | pcs. = | $ |
| | Basic | .181 × | pcs. = | $ |
| DDU Entry | Saturation W/S | .102 × | pcs. = | $ |
| | Carrier Route | .109 × | pcs. = | $ |

Total – Part B (Carry to front of form) $

Check one: [ ] Letter [ ] Automation-Compatible Flat (DMM 522) [ ] Other Nonletter – More than .2067 lb. (3.3067 oz.) But less than 1.0 lb. (16.0 oz.)**

| Entry Discount (If Any) | Presort/ Automation Discounts | Net Rate | Count (Pcs/Lbs) | Charge |
|---|---|---|---|---|
| None | Saturation W/S | .003 × | pcs. = | $ |
| | plus | .600 × | lbs. = | $ |
| | 125 pc. W/S | .013 × | pcs. = | $ |
| | plus | .600 × | lbs. = | $ |
| | Carrier Route | .018 × | pcs. = | $ |
| | plus | .600 × | lbs. = | $ |
| | 3/5 Digit ZIP + 4 Barcoded* | .046 × | pcs. = | $ |
| | plus | .600 × | lbs. = | $ |
| | 3/5 Digit Presort | .063 × | pcs. = | $ |
| | plus | .600 × | lbs. = | $ |
| | Basic ZIP + 4 Barcoded* | .084 × | pcs. = | $ |
| | plus | .600 × | lbs. = | $ |
| | Basic | .109 × | pcs. = | $ |
| | plus | .600 × | lbs. = | $ |
| BMC Entry | Saturation W/S | .003 × | pcs. = | $ |
| | plus | .542 × | lbs. = | $ |
| | 125-pc. W/S | .013 × | pcs. = | $ |
| | plus | .542 × | lbs. = | $ |
| | Carrier Route | .018 × | pcs. = | $ |
| | plus | .542 × | lbs. = | $ |
| | 3/5 Digit ZIP + 4 Barcoded* | .046 × | pcs. = | $ |
| | plus | .542 × | lbs. = | $ |
| | 3/5 Digit Presort | .063 × | pcs. = | $ |
| | plus | .542 × | lbs. = | $ |
| | Basic ZIP + 4 Barcoded* | .084 × | pcs. = | $ |
| | plus | .542 × | lbs. = | $ |
| | Basic | .109 × | pcs. = | $ |
| | plus | .542 × | lbs. = | $ |
| SCF Entry | Saturation W/S | .003 × | pcs. = | $ |
| | plus | .519 × | lbs. = | $ |
| | 125 pc. W/S | .013 × | pcs. = | $ |
| | plus | .519 × | lbs. = | $ |
| | Carrier Route | .018 × | pcs. = | $ |
| | plus | .519 × | lbs. = | $ |
| | 3/5-Digit ZIP + 4 Barcoded* | .046 × | pcs. = | $ |
| | plus | .519 × | lbs. = | $ |
| | 3/5-Digit Presort | .063 × | pcs. = | $ |
| | plus | .519 × | lbs. = | $ |
| | Basic ZIP + Barcoded* | .084 × | pcs. = | $ |
| | plus | .519 × | lbs. = | $ |
| | Basic | .109 × | pcs. = | $ |
| | plus | .519 × | lbs. = | $ |
| DDU Entry | Saturation W/S | .003 × | pcs. = | $ |
| | plus | .496 × | lbs. = | $ |
| | 125-pc. W/S | .013 × | pcs. = | $ |
| | plus | .496 × | lbs. = | $ |
| | Carrier Route | .018 × | pcs. = | $ |
| | plus | .496 × | lbs. = | $ |

*Available only for Automation-Compatible Flats (DMM 522)
**Letter-size pieces cannot be claimed at the 125-piece W/S rate Total – Part D (Carry to front of form) $ PS Form 3602-R, June 1992 *(Reverse)* *U.S. GPO: 1992-312-805/82486

Fig. 6A

```
This list is not required. It is provided merely for your interest.
It shows the type of each sack and where it is going.
To learn contents of each sack, see accompanying SACKTOTS.TXT.

      LIST FOR SACK LABELS SHOWING TOP LINE/2nd LINE(2nd LINE)
          This copyrighted program was written by and for
                          Paul W. Bouchard
                      Use by anyone else is illegal
                            ===========
                            (C) 1994 by
                           Paul Bouchard
                           RR 2 Box 169
                      Orrington, ME 04474-9606
                         Tel. 207-825-4950
                            ===========
(This filename is SACKLABS.TXT)
03/18/97 16:41:06

   NOTES: 3-digit ZIP codes in parentheses should go right aligned
          on the 2nd line.
          State abbreviations after the / mark should go right aligned
          on the 2nd line or before the 3-digit ZIP in parentheses.
 SACKDEST
 A  MS   MXD PORTLAND ME  040/MIXED STATES
 B  5   GLENBURN              ME  04401
 C    3    BANGOR ME                044
 D    3    BANGOR ME                046
 E    3    BANGOR ME                047
 F    3    BANGOR ME                049
```

Fig. 8

This list is not required. It is provided merely for your interest.
It shows how many pieces are in which type of package and sack.
To learn destination of each sack, see accompanying sacklist.

LIST SHOWING ENDORSEMENT AND COUNT OF EACH PACKAGE IN EACH SACK
This copyrighted program was written by and for
Paul W. Bouchard
Use by anyone else is illegal

==========

(C) 1994 by
Paul Bouchard
RR 2 Box 169
Orrington, ME 04474-9606
Tel. 207-825-4950

==========

(THIS FILENAME IS SACKTOTS.TXT)

| Recnum | Sack Code | Sack Type | Right end of Endorsement Line | Pkg. Count | | Sack Count |
|---|---|---|---|---|---|---|
| 1646 | A | M | **MIXED STATES | 7 | | |
| 1627 | A | M | *ALL FOR STATE | 19 | | |
| 1562 | A | M | *5-DIGIT 04330 | 11 | | |
| 1584 | A | M | ***3-DIGIT 043 | 16 | | |
| 1573 | A | M | *5-DIGIT 04849 | 11 | | |
| 1600 | A | M | ***3-DIGIT 048 | 27 | = | 91 |
| 1 | B | 5 | *5-DIGIT 04401 | 176 | = | 176 |
| 177 | C | 3 | *5-DIGIT 04402 | 11 | | |
| 188 | C | 3 | *5-DIGIT 04412 | 55 | | |
| 243 | C | 3 | *5-DIGIT 04416 | 14 | | |
| 257 | C | 3 | *5-DIGIT 04419 | 16 | | |
| 273 | C | 3 | *5-DIGIT 04422 | 16 | | |
| 289 | C | 3 | *5-DIGIT 04426 | 27 | | |
| 316 | C | 3 | *5-DIGIT 04427 | 29 | | |
| 345 | C | 3 | *5-DIGIT 04428 | 11 | | |
| 356 | C | 3 | *5-DIGIT 04429 | 15 | | |
| 371 | C | 3 | *5-DIGIT 04430 | 24 | | |
| 395 | C | 3 | *5-DIGIT 04443 | 12 | | |
| 407 | C | 3 | *5-DIGIT 04444 | 36 | | |
| 443 | C | 3 | *5-DIGIT 04448 | 11 | | |
| 454 | C | 3 | *5-DIGIT 04450 | 11 | | |
| 465 | C | 3 | *5-DIGIT 04456 | 21 | | |
| 486 | C | 3 | *5-DIGIT 04457 | 36 | | |
| 522 | C | 3 | *5-DIGIT 04460 | 14 | | |
| 536 | C | 3 | *5-DIGIT 04462 | 22 | | |
| 558 | C | 3 | *5-DIGIT 04463 | 17 | | |
| 575 | C | 3 | *5-DIGIT 04468 | 30 | | |
| 605 | C | 3 | *5-DIGIT 04473 | 14 | | |

Fig. 9

| | | | | | | |
|---|---|---|---|---|---|---|
| 619 | C | 3 | *5-DIGIT 04474 | 14 | | |
| 633 | C | 3 | *5-DIGIT 04496 | 18 | | |
| 1020 | C | 3 | ***3-DIGIT 044 | 163 | = | 637 |
| 651 | D | 3 | *5-DIGIT 04605 | 40 | | |
| 691 | D | 3 | *5-DIGIT 04609 | 10 | | |
| 701 | D | 3 | *5-DIGIT 04619 | 22 | | |
| 723 | D | 3 | *5-DIGIT 04622 | 12 | | |
| 735 | D | 3 | *5-DIGIT 04630 | 11 | | |
| 746 | D | 3 | *5-DIGIT 04654 | 17 | | |
| 763 | D | 3 | *5-DIGIT 04666 | 12 | | |
| 775 | D | 3 | *5-DIGIT 04668 | 11 | | |
| 786 | D | 3 | *5-DIGIT 04694 | 17 | | |
| 1183 | D | 3 | ***3-DIGIT 046 | 156 | = | 308 |
| 803 | E | 3 | *5-DIGIT 04730 | 70 | | |
| 873 | E | 3 | *5-DIGIT 04747 | 13 | | |
| 886 | E | 3 | *5-DIGIT 04765 | 12 | | |
| 1339 | E | 3 | ***3-DIGIT 047 | 47 | = | 142 |
| 898 | F | 3 | *5-DIGIT 04901 | 16 | | |
| 914 | F | 3 | *5-DIGIT 04915 | 26 | | |
| 940 | F | 3 | *5-DIGIT 04928 | 17 | | |
| 957 | F | 3 | *5-DIGIT 04930 | 17 | | |
| 974 | F | 3 | *5-DIGIT 04939 | 10 | | |
| 984 | F | 3 | *5-DIGIT 04953 | 13 | | |
| 997 | F | 3 | *5-DIGIT 04974 | 11 | | |
| 1008 | F | 3 | *5-DIGIT 04976 | 12 | | |
| 1386 | F | 3 | ***3-DIGIT 049 | 176 | = | 298 |

Total in all sacks is: 1652

Fig. 9A

This list is not required. It is provided merely for your interest.
It shows how many pieces are in which type of package and sack.
To learn destination of each sack, see accompanying sacklist.

LIST SHOWING ENDORSEMENT AND COUNT OF EACH PACKAGE IN EACH SACK
This copyrighted program was written by and for
Paul W. Bouchard
Use by anyone else is illegal (C) 1994 by
Paul Bouchard
RR 2 Box 169
Orrington, ME 04474-9606
Tel. 207-825-4950

(THIS FILENAME IS SACKTOTS.TXT)

| Recnum | Sack Code | Sack Type | Right end of Endorsement Line | Pkg. Count | | Sack Count |
|---|---|---|---|---|---|---|
| 1646 | A | M | **MIXED STATES | 7 | | |
| 1627 | A | M | *ALL FOR STATE | 19 | | |
| 1562 | A | M | *5-DIGIT 04330 | 11 | | |
| 1584 | A | M | ***3-DIGIT 043 | 16 | | |
| 1573 | A | M | *5-DIGIT 04849 | 11 | | |
| 1600 | A | M | ***3-DIGIT 048 | 27 | = | 91 |
| 1 | B | 5 | *5-DIGIT 04401 | 176 | = | 176 |
| 177 | C | 3 | *5-DIGIT 04402 | 11 | | |
| 188 | C | 3 | *5-DIGIT 04412 | 55 | | |
| 243 | C | 3 | *5-DIGIT 04416 | 14 | | |
| 257 | C | 3 | *5-DIGIT 04419 | 16 | | |
| 273 | C | 3 | *5-DIGIT 04422 | 16 | | |
| 289 | C | 3 | *5-DIGIT 04426 | 27 | | |
| 316 | C | 3 | *5-DIGIT 04427 | 29 | | |
| 345 | C | 3 | *5-DIGIT 04428 | 11 | | |
| 356 | C | 3 | *5-DIGIT 04429 | 15 | | |
| 371 | C | 3 | *5-DIGIT 04430 | 24 | | |
| 395 | C | 3 | *5-DIGIT 04443 | 12 | | |
| 407 | C | 3 | *5-DIGIT 04444 | 36 | | |
| 443 | C | 3 | *5-DIGIT 04448 | 11 | | |
| 454 | C | 3 | *5-DIGIT 04450 | 11 | | |
| 465 | C | 3 | *5-DIGIT 04456 | 21 | | |
| 486 | C | 3 | *5-DIGIT 04457 | 36 | | |
| 522 | C | 3 | *5-DIGIT 04460 | 14 | | |
| 536 | C | 3 | *5-DIGIT 04462 | 22 | | |
| 558 | C | 3 | *5-DIGIT 04463 | 17 | | |
| 575 | C | 3 | *5-DIGIT 04468 | 30 | | |
| 605 | C | 3 | *5-DIGIT 04473 | 14 | | |

Fig. 10

| | | | | | | |
|---|---|---|---|---|---|---|
| 619 | C | 3 | *5-DIGIT 04474 | 14 | | |
| 633 | C | 3 | *5-DIGIT 04496 | 18 | | |
| 1020 | C | 3 | ***3-DIGIT 044 | 163 | = | 637 |
| 651 | D | 3 | *5-DIGIT 04605 | 40 | | |
| 691 | D | 3 | *5-DIGIT 04609 | 10 | | |
| 701 | D | 3 | *5-DIGIT 04619 | 22 | | |
| 723 | D | 3 | *5-DIGIT 04622 | 12 | | |
| 735 | D | 3 | *5-DIGIT 04630 | 11 | | |
| 746 | D | 3 | *5-DIGIT 04654 | 17 | | |
| 763 | D | 3 | *5-DIGIT 04666 | 12 | | |
| 775 | D | 3 | *5-DIGIT 04668 | 11 | | |
| 786 | D | 3 | *5-DIGIT 04694 | 17 | | |
| 1183 | D | 3 | ***3-DIGIT 046 | 156 | = | 308 |
| 803 | E | 3 | *5-DIGIT 04730 | 70 | | |
| 873 | E | 3 | *5-DIGIT 04747 | 13 | | |
| 886 | E | 3 | *5-DIGIT 04765 | 12 | | |
| 1339 | E | 3 | ***3-DIGIT 047 | 47 | = | 142 |
| 898 | F | 3 | *5-DIGIT 04901 | 16 | | |
| 914 | F | 3 | *5-DIGIT 04915 | 26 | | |
| 940 | F | 3 | *5-DIGIT 04928 | 17 | | |
| 957 | F | 3 | *5-DIGIT 04930 | 17 | | |
| 974 | F | 3 | *5-DIGIT 04939 | 10 | | |
| 984 | F | 3 | *5-DIGIT 04953 | 13 | | |
| 997 | F | 3 | *5-DIGIT 04974 | 11 | | |
| 1008 | F | 3 | *5-DIGIT 04976 | 12 | | |
| 1386 | F | 3 | ***3-DIGIT 049 | 176 | = | 298 |

Total in all sacks is: 1652

Fig. 10A

BULK MAIL ENTIRE PREPARATION METHOD AND KIT

This patent contains a microfinche appendix which includes 1 microfinche and 24 frames.

FIELD OF THE INVENTION

The field of invention relates to bulk mail preparation, specifically starting with a random address list and ending with a bulk mailing meeting postal verification standards.

BACKGROUND-DISCUSSION OF PRIOR ART

The U.S. Post Office allows customers, after obtaining proper permits and paying proper fees, to obtain postage rates considerably lower than 1st class by presenting certain types of mail as bulk mail. My first embodiment will be for 3rd class bulk mail.

The post office accepts 3rd class bulk mail in sacks, trays, or pallets, depending on circumstances. My first embodiment describes using sacks.

Categories of mail include automation-compatible or non-automation-compatible, letters, flats, etc. My first embodiment pertains to non-automation-compatible letters or flats.

With few exceptions, all 3rd class bulk mailpieces must be placed into packages in ascending ZIP code order. They are collected in specific groups of at least 10 pieces but not exceeding a thickness of 4" (preferred, although 6" is permitted) and all facing the same direction. They are encircled with rubber bands or other material to form packages (sometimes referred to in some patents as "bundles") and placed into sacks. If the packages are not over 1" thick, one band placed around the short dimension will suffice. If the packages are 1" to 4" thick, two bands must be used, the 1st placed around the long dimension, and the second placed around the short dimension. If a collection would make a package more than 4" thick, it preferably should be divided into packages less than 4" thick. When any count of 5-digit, 3-digit, or state mailpieces in packages exceeds 124 (or 15 pounds in weight) they must be placed into a sack and labeled accordingly.

There are additional specific preparation requirements set forth in the Domestic Mail Manual or DMM (postal rules and regulations) for 3rd class bulk mail. Following are some of them, which are here presented in my own words:

5-DIGIT PACKAGES a. If 10 or more pieces are going to the same ZIP, they must be made into a 5-digit package. A red "D" sticker must be affixed in the lower left hand corner of the package or an endorsement must be located above the name and address. If 125 or more go to the same ZIP, they must be made into packages, then placed into a mail sack. The sack must be labeled correctly so it will be sent to that ZIP for delivery.

3-DIGIT PACKAGES b. After the 5-digit ZIP packages are made up, if 10 or more pieces go to the same 3-digit ZIP (ZIP codes which have the same first 3 digits), they must be made into a 3-digit package or packages. A green "3" sticker must (in the same manner as above stated) be placed in the lower left corner, or an endorsement used (also as above stated). If there are 125 or more they must be placed into a sack, which must be labeled correctly so the sack will go to the post office designated to distribute mail to that particular 3-digit area of the country.

STATE PACKAGES c. After the 3-digit packages have been assembled, if there are 10 or more pieces going to the same state, they must be made into a state package. An orange "S" must be affixed or an endorsement line displayed, and if 125 or more, they must be placed into a sack in similar manner.

MIXED STATES PACKAGES d. Finally, if there are pieces left, they must be made up into a mixed states package or packages. A brown "MS" must be affixed or an endorsement line displayed, and they must be placed into a sack, with no minimum quantity requirement.

OTHER PACKAGE TYPES AND SACK TYPES OPTIONAL e. Other types of packages and sacks are optional, and may be utilized, but are not discussed here because they are optional.

PRIOR ART CITED BY PATENT OFFICE

Washington (3,557,949) uses a conveyor to move Tailpieces, a scanner to detect codes, a solenoid to physically move out of alignment certain mailpieces to indicate a package division, and much more, to determine package groups, and that is as far as he goes.

Jackson (4,167,476) uses a rather elaborate mechanical and electrical system, which applies mailing labels to articles, then uses machinery to count and sort them into stacks which will form bundles. That is as far as it goes.

Allen (4,731'741) counts and sorts random address entries into bulk mail order prior to printing addresses. Allen uses a separator label between package groups, which is later discarded as packages are formed. The person preparing the mailing reads the separator label at the end of each package group, then selects from an available supply and affixes to the top mailpiece in each package, a sticker of the proper denomination ("D", "3", "S", "C") indicating the nature of the commonality of address entries on the labels of the bundle), as instructed by the separator label, for all except mixed states bundles, which have no sticker.

DETERMINING CORRECT SACK LABEL

Determining the top line to appear o sack labels other than 5-digit sacks is not quick and easy. The top line will contain th e name of a city, its state's 2-letter abbreviation, and a 3-digit or 5-digit ZIP. The 3-digit ZIP for a 3-digit sack is no problem as you have just placed the packages into a sack so you know it. The destination city is the tricky one. One must consult the current Domestic Mail Manual or other postal resource to get this information its current form, as it is subject to change. For any given 3-digit sack, you must first check a list of about 240 possibilities, and if the 3-digit ZIP and city are not on that list, you must consult a second list of about 225 possibilities. It will be found on the 1st or 2nd list, but both lists are subject to change and frequent updating by the USPS.

Determining the top line of state sacks calls for a similar search, but involves only about 50 possible cities and ZIPs, not obvious. For example, a New York state sack currently must be labeled "DIS NORTH JERSEY N.J. 07099", and a Connecticut state sack must be labeled "DIS SPRINGFIELD Mass. 010". These also are subject to change.

3-DIGIT SAC LABELS WERE DIFFICULT TO DETERKINE

If 125 or more mailpieces were going to the same 3-digit ZIP code area, they were required to be placed into a 3-digit sack. Determining the top line for sack labels for 3-digit sacks was rather difficult. I would consult the current Domestic Mail Manual, first searching a 2-page list of about 240 3-digit ZIPs in numerical order. If the 3-digit ZIP in question was there, the contents of the top line would be found beside it. If it was not be on that list, however, I would then have to consult a different list, of about 225 possibilities on 3 pages, in somewhat numerical order but with extreme exceptions. When the 3-digit ZIP was found on this list, the information beside it had to be altered according to instructions at the top of the page, and then used as a top line on the sack label.

Seeking efficiency, after trying various ways, I programmed a computer to print a list showing how many mailpieces were going to each 5-digit ZIP and to each 3-digit ZIP code area. Prior to affixing labels I would mark the list to indicate which packages would go into which sacks, the destinations of which I learned by one of several means.

5-DIGIT SACK LABELS WERE EASY

The first time down through the list, I would note if any 5-digit ZIPs had a count of 125 or more. If so, I would prepare a sack label by hand printing the city, state abbreviation and 5-digit ZIP onto a blank sack label, then draw a rectangle on the border of my list and mark the top line of the sack label in the rectangle, so when I was affixing labels and came to that spot, I would see that I must assemble the mailpieces for that ZIP code into packages, place them into a sack, and place the corresponding sack label into the sack label holder.

3-DIGIT SACK LABELS WERE NOT EASY

After all 5-digit sacks are determined, if 125 or more mailpieces (including 5-digit packages which had not been placed into sacks) go to the same 3-digit ZIP code area, they had to be placed into a 3-digit sack. I would consult the Domestic Mail Manual, searching among the approximately 240 possibilities list, then perhaps the approximately 225 possibilities list, for the correct sack label top line. I would then hand print it on a blank sack label, draw a rectangle representing that sack label on my list beside the last ZIP to be placed into that sack, and mark the same top line information in the drawn rectangle, so when I reached that point as I was affixing labels I would know which sack to place the packages into.

ADOPTING NEW TECHNOLOGY

The red "D" sticker on a 5-digit package assists postal employees in determining proper routing of the package. Sometime about the 1980's the post office began permitting an alternate choice to affixing red "D" stickers to each 5-digit package (and "3", "S" and "MS" stickers to other packages). They permit what they call an "endorsement" to be placed above the name and address on mailpieces, on a line by itself (with one exception) and preceded by a series of attention-getting marks such as asterisks. If the top mailpiece in a package has the proper endorsement on it, a "D" sticker is not required. Many mailers have adopted the endorsement, and place it on all mailpieces in a 3rd class bulk mailing. This of course assures that the top piece of each package will display an endorsement, so "D", "3", "S" and "MS" stickers would not be required.

Following are examples of endorsements which may be used on 3rd class bulk mail:

****************** 5-DIGIT 22202 (the assembled package is referred to as a "5-digit package")

******************** 3-DIGIT 222 (the assembled package is referred to as a "3-digit package")

****************** ALL FOR STATE (the assembled package is referred to as a "state package")

******************* MIXED STATES (the assembled package is referred to as a "mixed states package")

When affixing labels to mailpieces and assembling packages, having to watch closely for the end of a collection that will form a package can be difficult unless that label is much different than other labels. Then, too, it takes time and effort to select, peel off and affix a "D" or other sticker to each package.

Many mailers have adopted the endorsement, thus eliminating the need to put "D", "3", "S" or "MS" stickers on the top mailpiece of each package, but place the endorsement on all mailpieces. This requires an extra line to be printed on each mailpiece or label. If mailpieces or labels are addressed by mechanical printers, printing an extra line on each label or mailpiece takes more time, uses more ink thereby reducing ribbon-life, and produces more wear-and-tear on a printer.

In patent 4,731,741 to Allen, 1988 Mar. 15, separator labels are disposed between the printed labels. Said separator labels indicate how many mailpieces made up the previous package. Apparently the person preparing the mail must make a decision based on this figure, and must have knowledge required to make a correct decision.

In patent 4,731,741 to Allen, 1988 Mar. 15, separator labels are disposed between the printed labels. Said separator labels indicate what group type the next package will be. This information was provided so the person affixing labels or addresses would know which type of sticker to affix to the face of the top mailpiece in the package. Presumably the person affixing labels or addresses would then peel off a sticker from the correct roll of stickers provided by the post office, and affix it to the lower left hand corner of the top mailpiece in the package. This required time and effort.

Other mailers use endorsements, but have them appear on every mailpiece in the packages. In that case the person assembling the packages must watch closely to note when the ZIP changes, either on the endorsement or on the city-state-ZIP code line. This requires constant attention.

In patent 4,731,741 to Allen, 1988 Mar. 15, separator labels are disposed between the printed labels. Said separator labels could, depending on the particular mail list being used, approach ten per cent of the total number of labels needed for a mailing, a considerable number. Use of these labels not only wastes original cost for the blank labels, but increase the label printing time and wear and tear of the printer.

In patent 4,731,741 to Allen, 1988 Mar. 15, information is provided on separator labels so that the person affixing labels can gain knowledge so he/she may make proper decisions and take proper actions. This information is limited to individual packages, though. The determination of which sack to place the package into, and how that sack must be labelled, is left up to the person affixing labels or someone else.

WHAT'S WRONG WITH THE OLD WAY?

It appears that prior to my invention, preparation for 3rd class bulk mailing suffered the following disadvantages:

(a) A label was temporarily used for each package, then thrown away as waste. This waste could approach 10 percent of labels used.

(b) Printers and printer ribbons received unnecessary wear in printing labels which were then thrown away, or in printing endorsements on every label when only one per package was needed.

(c) Printing of labels took more time because of the extra labels printed and thrown away or the endorsement line being printed on every label when only one per package was needed.

(d) Time was expended selecting the correct "D", "3", "S" or "MS" sticker and affixing it to the top mailpiece of each package when one endorsement would eliminate the need for this action.

(e) The person affixing labels needed to know how many mailpieces were in a package, and had to make a decision based on that number, an important decision involving postage rates.

(f) No information was provided regarding options dependent on the count of a package, so the person affixing labels apparently needed to know postal rates and their classes or seek assistance of a knowledgeable person.

(g) No information was provided about how each and every sack must be labeled, so the person affixing labels apparently needed to know or learn how each and every sack must be labeled or seek assistance of a knowledgeable person.

(h) No information was provided about which sack a package must be placed into, so the person affixing labels apparently needed to know or learn which sack each package must be placed into or seek assistance of a knowledgeable person.

(i) No information was provided about postage rates and classes, so the person affixing labels apparently needed to know or learn which packages and/or sacks qualified for which postage rates and/or class or seek assistance of a knowledgeable person.

(j) No mailing statement or information therefor was provided, so the person affixing labels apparently needed to know how, and have all the information needed, to fill out a mailing statement or seek assistance of a knowledgeable person.

BRIEF SUMMARY OF THE INVENTION

The method of the invention involves automatically processing data from a random address list into a bulk m-ail sequence file having flagged package groups, endorsement line data indicating the commonality of address entries of each package group (also eliminating the need for stickers, such as “D”, “3”, “S”, and “MS”, on each package), and having mail sack codes.

The mail sack label information is automatically produced by means of special data fields derived from the USPS Domestic Mail Manual (DMM) mailing lists and continually updated. Each package group is coded to its correct sack, permitting an inexperienced person with mailpieces, when provided with a kit of the invention, to perform a bulk mailing to postal verification standards. The file can be used to print directly on mailpieces or on mailing labels which can be included in an easy bulk mail kit.

The Kit of the invention (when labels are used) consists of mailing labels, rubber bands, labeled mail sacks, instructions sheet, and USPS Form 3602 mailing statement.

Objects and Advantages:

Accordingly, several objects and advantages of my invention are:

(a) to avoid printing labels then discarding them;

(b) to keep printer and ribbon wear to a minimum by printing only what is needed for efficient operation;

(c) to keep printing time to a minimum by printing only what is needed for efficient operation;

(d) to prepare labels in such a manner than the person affixing them does not need to know or care whether the package is considered a “D”, “3”, “S”, or “MS” package;

(e) to prepare labels in such a manner that the person affixing them by hand does not need to know or care how many pieces are in any package or sack;

(f) to provide that the person assembling packages need not make any decisions dependent on the count of any package or sack;

(g) to prepare all sack labels and code each, so the person placing packages into sacks need not concern themselves with anything on a sack label except the sack code;

(h) to provide mailing labels on which a sack code is printed on the top label of each package, indicating at a glance which sack the package must be placed into. The sack code is made up of one or two letters, such as A or B or AA or AB, etc.;

(i) to provide that the person affixing labels need not be concerned with postage rates.

(j) to provide, except when not desired, a USPS mailing statement of the proper class, filled out with all necessary information regarding mailpiece counts and correct postage amounts, ready to complete, sign, and present to postal employee at time of mailing.

Further Objects and Advantages are:

(k) to produce and assemble all necessary materials for preparing a 3rd class bulk mailing fully compliant with relevant postal regulations, which can be efficiently performed by an inexperienced person;

(l) to provide labels containing all information so that an inexperienced person can accurately package and sack mailpieces to meet all postal requirements for bulk mail acceptance;

(m) to provide mailing labels in bulk mail order so that all mailpieces for each package are labeled and stacked sequentially;

(n) to advise persons affixing labels to begin at the last label of a package and work toward the first label to most efficiently use my method;

(o) to provide that labelled mailpieces are not turned face down to maintain proper sequence. They are piled one upon another face up until a label bearing a flag is placed on the pile, then the collection is made into a package;

(p) to provide labels on which a flag is used only on the mailpiece which will be the top mailpiece of a package, thus indicating that a package must be made;

(q) to provide labels with endorsements on the first mailpiece for each package so a “D”, “3”, “S”, or “MS” sticker is not required on each package;

(r) to provide accurately labeled mail sacks or the labels therefor, coded with A or B or AA or AB, etc., to correspond to the sack codes on the top label of each package, to indicate which packages are to be placed therein;

(s) to optionally provide the count of each package, printed on the labels destined for the top and bottom mailpieces of each package. Such information may be desired when labels are affixed by machine, and the person assembling packages can mentally count the rhythmic sound of the machine so as to be ready to remove the contents of a package at the correct time, without having to visually glance at each label to notice flags as they move along. On other labelling machines, the operator may set a counter and the machine will affix the preset number of labels and pause, so the procedure may be repeated after removing the labelled mailpieces. On other machines, after a group count has been labeled, a separator card could automatically be placed between mailpieces to separate the groups, as is sometimes required when mail trays are used rather than mail sacks. When labels are affixed by hand no count is needed, so labels can be printed without counts. A computer-operated labelling machine could flag the beginning or end of each package by a number of methods.

(t) to provide that the long strip of labels may be divided, so two or more people can affix labels and make packages simultaneously, by simply cutting between labels immediately above any label displaying a string of asterisks.

(u) to provide a strip of mailing labels that can be easily divided into individual package groups, so a person in charge can give single label groups to handicapped individuals incapable of fully comprehending how the system works, but who are capable of affixing labels in sequence until they have no more to affix, then call the person in charge to take those labeled mailpieces and provide another individual package group of labels to be affixed;

(v) to provide, for whatever reason, a system where mail sacks or other containers are labeled only with a container code, so the person assembling packages of mailpieces or other objects, and placing them in containers, would have no hint as to the destination of the containers. A separate list could be kept so the labels could be applied later in secret.

(w) to provide, when desired, rubber bands or other means to make packages of mailpieces, with instructions for procedures to make acceptable packages;

(x) to provide that the person preparing the mailpieces will not have to consult with the USPS Domestic Mail Manual or postal employees to determine which package should be placed into which sack, and how that sack should be labelled. In my invention, a file in a computer contains all the information as copied from the Domestic Mail Manual labelling lists which is required to determine the correct labelling of the sack label. The records of the mail list database that are assigned a sack number are related by 3-digit ZIP codes to the matching records in the SCF or STATES lists. The information that must appear on the sack labels is then automatically copied from the SCF or STATES list database to the appropriate records in the address list database.

(y) to provide that after an inexperienced person has affixed all labels, assembled all mailpieces into packages, and placed all packages into sacks which sack labels display the same sack code, he/she may close all sacks and transport them to the post office. Upon paying correct postage as indicated on the prepared mailing statement, dating and signing said mailing statement and offering it to the postal employee accepting 3rd class bulk mail, the mailing will be accepted as 3rd class bulk mail.

Further objects and advantages of my invention will become apparent from a consideration of the drawings and ensuing description.

CARRIER ROUTE MAIL COULD BE HANDLED IN SIMILAR FASHION

The USPS currently requires an endorsement on every piece in carrier route packages. I envision a request to USPS permitting the use of endorsements on only the top mailpiece of those packages. If permitted, my invention would be of equal value for carrier route mailings. Until permitted, instead of using the endorsement as a flag in carrier route mailings, the package count and sack code on the 2nd line have served adequately as a flag in tests.

I further envision a request to USPS to permit the sack code to be placed at the beginning of the endorsement line, followed by one blank space, in place of the first 3 asterisks.

The program has been rewritten and tested for mailings that are entered at Bulk Mail Acceptance Units (there are one or several in most states), in which case packages and/or sacks destined for certain SCF 3-digit ZIP code areas may receive SCF entry postage discounts. The original program can be rewritten to provide that option upon request, with the ability to enter the desired SCF ZIP codes.

The program also can be altered so that printing would be automatically initiated, but because some printing is on mailing labels, and other printing is on paper, and since in some cases it is more practical to transmit the data via modem or other means to a distant location where the printing is done, it was decided to not include printing in the program.

A SAMPLE OF INSTRUCTIONS FOLLGWS:

INSTRUCTIONS FOR PREPARING BULK MAIL

USING AN EASY BULK MAIL KIT

NOTE: An English language illiterate can perform steps 1. through 10. if he is told and shown how, and allowed to demonstrate the ability to perform each step, provided he is told for step 5. to wrap a length band, then a width band, around each package group, and for step 10. to have a literate person date and sign the mailing statement, and prepare a check for postage.

Verify that the kit contains mail sacks with sack labels displaying hand printed letters of the alphabet on the right end of each sack label, rubber bands, printed mailing labels, U.S. Postal Service Form 3602 (mailing statement), and this sheet of instructions. Also included may be two unnecessary reports provided for your interest only.

The long strip of labels may be divided, so 2 or more people can affix labels and make packages simultaneously, by cutting between labels immediately above any label displaying a string of asterisks.

A sack code consists of one or two letters, such as A, B, C, AA, AB, etc.

Sack codes are printed on the right end of each sack label and on the first mailpiece label of each package.

Numbers which may be near the right end of the 2nd line of top labels and the first line of bottom labels of each package are package count. You may ignore counts unless needed for labelling machine operation.

1. IMPORTANT: Begin at the bottom or last label printed on the label strip. If the strip has been divided into several, begin at the bottom of each strip.

2. Affix a label to a mailpiece and place it face up on a surface or tray.

3. Affix next label and pile the mailpiece face up upon the previous one.

4. Continue until you have affixed a label containing a row of asterisks.

5. With the row of asterisks visible on the top mailpiece, make the pile into a package. If the pile is not over one inch thick, wrap 1 rubber band around the short dimension or girth. For more than one inch thick, wrap a first rubber band around the long dimension, and a second rubber band around the short dimension or girth, forming a package. Postal regulations specify putting the rubber band on the length before the girth.

6. Look on top label for sack code at the right hand end of the 2nd line.

7. Place package into mail sack which sack label has the same sack code.

8. Repeat steps 2 thru 7 until all mail is packaged and placed into sacks.

9. Close all sacks and transport to post office.

10. Complete, date and sign mailing statement, and pay postage with check for postage payable to Postmaster.

If any questions or problems should arise, please call Zip Sort Label & Mail at 207-825-4950. Thank you.

BRIEF DESCRIPTION OF THE DRAWINGS

NOTE: A microfiche is included as an appendix. I have designated it as FIG. 1.

In the drawings, closely related figures have the same number but different alphabetic suffixes.

FIG. 2 shows overall operation of one embodiment for preparation of a complete bulk nail kit.

FIG. 2A is a reduced version of FIG. 2 for the Gazzette.

FIG. 4 shows a portion of a strip of mailing labels with information indicating to an inexperienced person when to make up a package of mailpieces, which sack to place the package into, and package count which may be used to preset an autoartic labelling machine to affix the desired number of labels before pausing.

FIG. 5 shows a single mailpiece, a box of rubber bands, and an assembled package of mailpieces, secured with rubber bands, with the top address entry displaying all information necessary for the handler to know when to make the package, and which sack to place it into.

FIG. 6 shows a sack label with sack code, attached to a U.S. mail sack.

FIGS. 8, 8A, 8B, 8C, 8D, 8E, and 8F show a flow chart describing the operation of the computer program in the microfiche, to produce a bulk mail sorted sequence file, a sack label report file, and a count report file.

FIG. 9 shows a typical sack label report 32, which shows what must appear on the first line and right end of the second line of each sack label needed for the mailing.

FIGS. 10 and 10A show a typical count report 36, which contains information which is needed when filling out the mailing statement, and other useful information.

REFERENCE NUMERALS IN DRAWINGS

Figure 1:
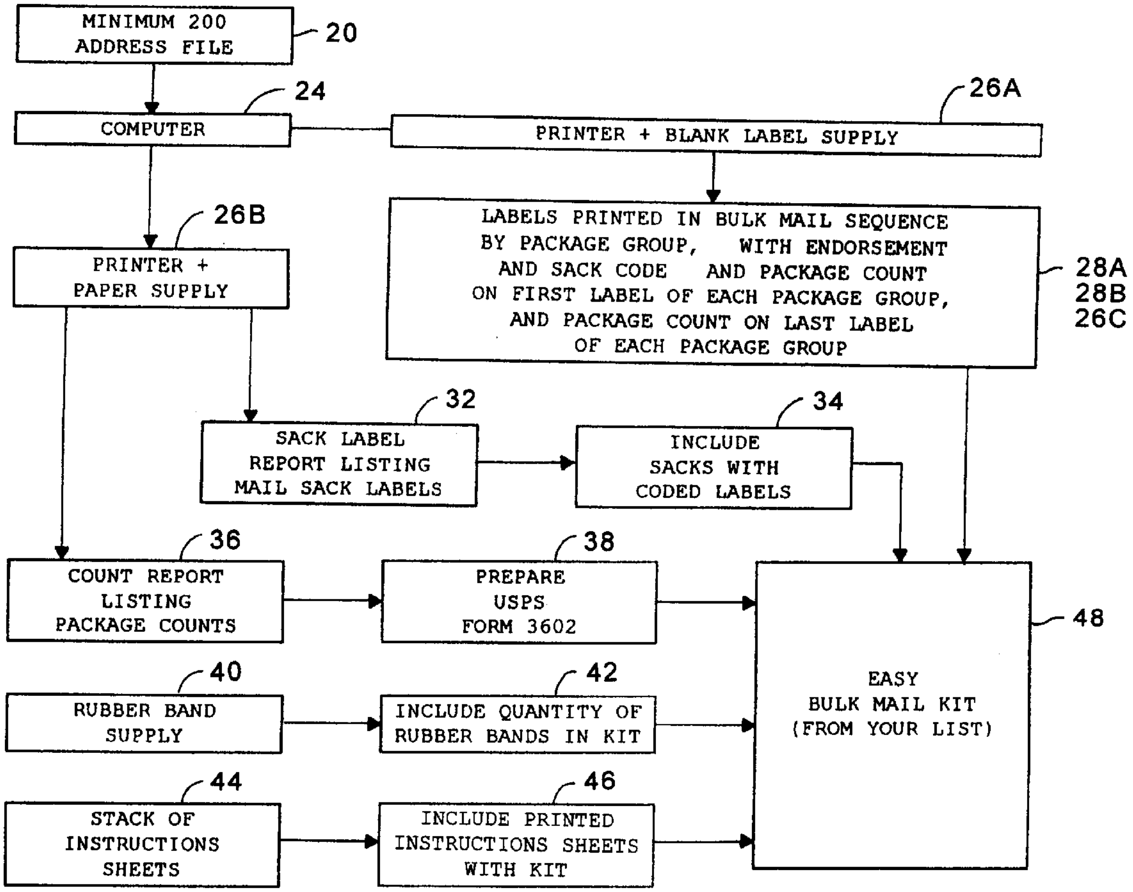
FIG. 1 is a microfiche appendix of the computer program which will produce files of two reports and prepare the address file for printing.

20 minimum 200 address file
24 computer
26A printer with supply of blank labels (or envelopes)
26B printer with supply of blank paper
28A top label of a package group
28B intermediate label of a package group
28C bottom label of a package group
32 sack label report listing mail sack label information
34 include sacks with coded labels
36 count report listing mailpiece count per package and totals per sack
38 USPS form 3602
40 rubber band supply
42 include quantity of rubber bands for kit
44 stack of instructions sheets
46 include printed instruction sheet with kit
48 kit of materials enabling one to do bulk mailing
50 string of asterisks used as a flag and part of an endorsement line
52 endorsement
54 package count of mailpieces
56 sack code
58 cutting location to divide label strips
59 mailpiece
60 package of mailpieces
62 sack label
64 mail sack
66 label strip backing
67 obtaining a mailing list
68 inputting into KITFILE.DBF in computer
69 sorting
70 count and flag >9 to same 5-digit ZTP, add endorsement
71 count and flag >124 for 5-digit sack
72 move all for 5-digit sacks to separate file, numbering sequentially
73 filter out all flagged to 5-digit packages
74 count and flag >9 to same 3-digit ZIP, add endorsement
75 remove filter
76 count and flag >124 for 3-digit sack, numbering sequentially
77 move all for 5-digit packages in 3-digit sacks to separate file
78 move all for 3-digit packages in 3-digit sacks to separate file
79 replace PK field with "M" for PK=' '
80 filter out all except PK="M"
81 relate to DMMLISTS.DBF, transfer ST2 to KITFILE.DRF
82 flag PK field with "S" for each ST2 count >9
83 filter out all except PK field="S"
84 endorse 1st, put count in PKCT of 1st & last record of each package group
85 filter out all except PK="M"
86 assign 1 to SKNUM field, endorse 1st record, replace all SK with "M"
87 move all to separate file
88 remove filter
89 relate to DMMLISTS.DBF, transfer ST2 to KITFILE.DRF for each matching ZTP3
90 replace SK with "S" for >124 to same ST2
91 replace SK with "M" for <125 to same ST2
92 number consecutively each ST2 sack, adding to highest in DONE33.DBF
93 filter out all except SK="M" and PKGLTNF. #
94 replace all SKNUM with 1
95 remove filter
96 move to DONE5S.DBF for PK="5" and SK="S"
97 separate file DONE5S.DBF
98 move to DONE3S.DBF for PK="3" and SK="S"
99 separate file DONE3S.DBF
100 move to DONESS.DBF for PK="S" and SK="S"
101 separate file DONESS.DBF
102 move to DONE5M.DBF for PK="5" and SK="M"
103 separate file DONE5M.DBF
104 move to DONE3M.DRF for PK="3" and SK="M"
105 separate file DONE3M.DBF
106 move to DONESM.DBF for PK="S" and SK="M"
107 separate file DONESM.DBF
108 NOTE: KITFILE.DBF empty, package groups in DONE??.DBF endorsed 109 NOTE: all DONE??.DBF sacks have been numbered into a single sequence
110 use (open) KITFILE (now empty)
111 append from all DONE??.DBF files.
112 SKLET field is replaced by alpha equivalent of SKNUM field
113 NOTE: SKLET is also referred to as sack code
114 NOTE: KITFILE is now in bulk mail order by package group.
115 NOTE: each package group in DONE??.DBF files has endorsemnt in 1st record
116 filter out all except SK="M" and PKGLINE # ' '
117 preparing SACKDEST field for "M" sacks for copying to sack label report
118 remove filter
119 filter out all except SK="5" and PKGLINE # ' 40
120 preparing SACKDEST field for "5" sacks for copying to sack label report
121 remove filter
122 filter out all except SK="3" and PKGLINE # ' 40
123 relate 1st record for each SKNUM to DMMLISTS.DBF
124 preparing SACKDEST field for "3" sacks for copying to sack label report.
125 remove filter
126 filter out all except SK="S" and PKGLINE # ' '
127 relate 1st record for each SKNUM to DMMLISTS.DBF
128 preparing SACKDEST field for "S" sacks for copying to sack label report
129 remove filter
130 NOTE: kitfile now has SACKDEST for each SKNUM
131 SKDEST is now listed to sack label report
132 data now copied to count report

DESCRIPTION OF THE PREFERRED EMBODIMENT OF THE INVENTION

FIG. 1 is a microfiche appendix of the computer program used to change a random address file into a file that is bulk mail sorted by package, and produce two files of reports used to prepare sack labels and a mailing statement.

A typical embodiment of the system of label and materials preparation is illustrated in FIG. 2. A computer operator will check the input file for conformity to an existing database, alter it or the database if necessary to conform, start the program, and after the program has completed its operation, print address labels and reports when desired. Address file 20 is inputted by any means into a computer 24. Computer 24 has ample memory and disk space for the job, and a program as seen on microfiche appendix to manipulate address file 20 and produce files containing sack label report 32 and count report 36. After manipulation and addition of information, address file 20 is printed by printer+label supply 26A on mail labels 28A 28B 28C (or envelopes). This printing is initiated by a person capable of operating computer and printer using any acceptable label printing program. Mailing labels 28A 28B 28C are affixed on site or placed into bulk mail kit 48 to be transported. Sack label report 32 and count report 36 are printed at the command of the computer operator. Sack label report 32 is used to select or prepare the needed mail sack labels (by selecting from existing stock or by copying information from the report onto incomplete sack labels for letters or flats) and printing sack code 56 on each. Sack labels 62 are placed into mail sack label holders and labeled sacks 64 are used on site or placed into mail kit 48. Court report 36 is used by an experienced person to calculate mailpiece counts and postage which is entered onto a USPS form 3602 38 (mailing statement). Form 3602 38, a quantity of rubber bands 40, and an instructions sheet 46 are used on site or included in a complete bulk mail kit 48, which may then be transported or used on site.

Microfiche appendix is the source code of a program to prepare the files of address labels and reports for printing. Since this is rather standard database program work, similar results may be attained by many other methods of programming, and computers with more speed and memory than the one used could accomplish the same results with simpler programming. This program can be used to manipulate mailing list 20, produce reports 32 and 36, and print mailing labels 28A 28B 28C by a person who knows nothing about bulk mailing, but knows how to input mailing list 20 into the database in computer 24, start the program, and command the computer to print labels 28A 28B 28C and reports 32 and 36. It is assumed that the person operating the computer has the ability to use the computer and printer to perform these tasks. In some cases it is more practical to transmit via modem to a distant location the data to be printed.

Figure 3:
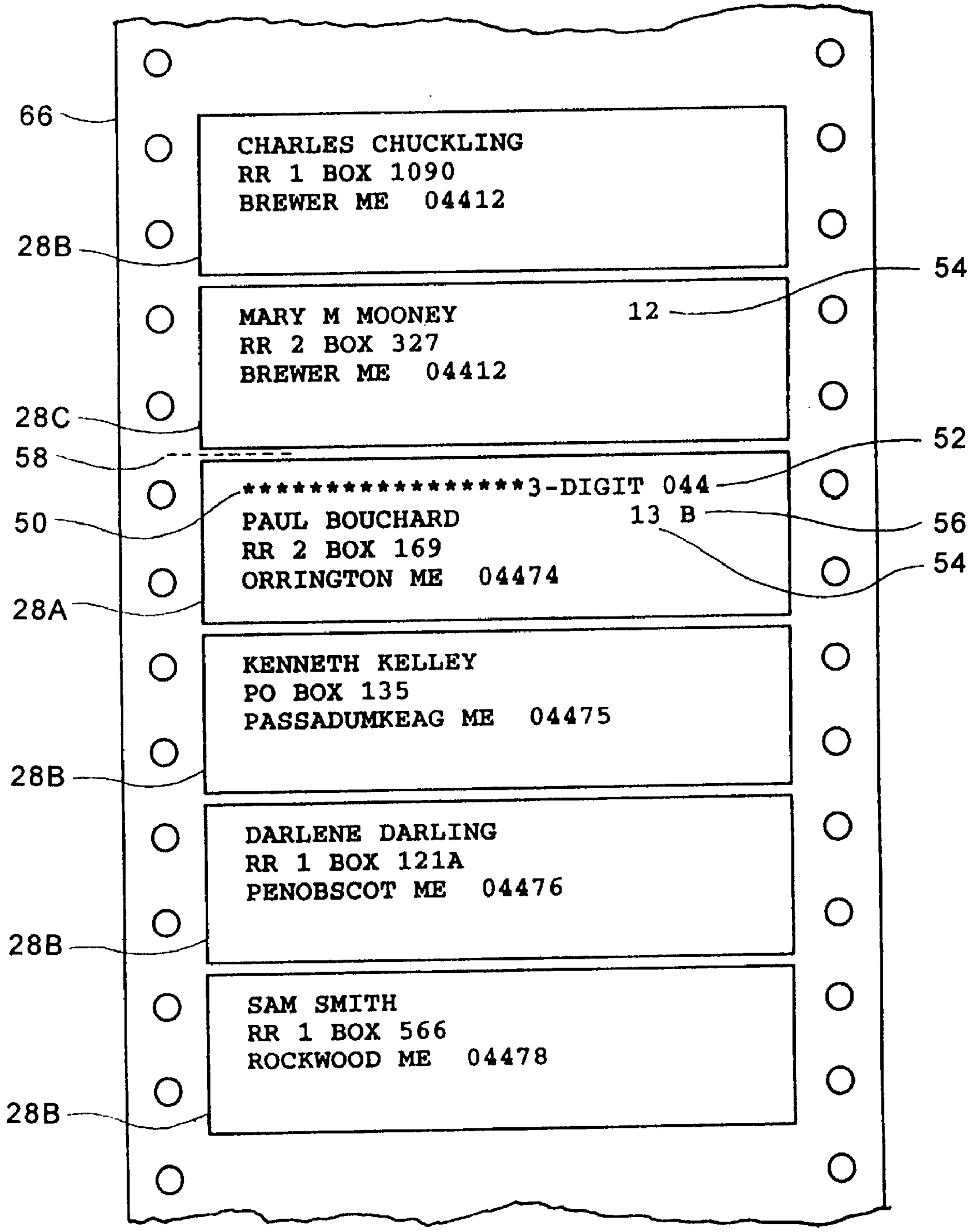
FIG. 3 shows two reports (32, 36) produced by the computer and printer as instructed by the program in the microfiche appendix.

FIGS. 3 and 9 show a sack label report 32. The sack label report 32 shows the type of each sack and where it is doing. The sack label report 32 contains a list of sack label notations showing what must appear on the top line of the each sack label and if applicable what must appear on the right end of the second line of the same sack label . The top line notation usually contains destination information including a 3-digit or 5-diait ZTP code. The right end of the second line might contain useful information such as a state abbreviation or "MIXED STATES" or 3- or 5-digits in parentheses. All information for a particular sack label is listed on one line of the sack label report with a slash separating the portion which must go on the top line of the sack label from the portion which must go on the right end of the second line of the sack label. The sack label report 32 also contains sack types (5-digit, 3-digit, state, or mixed states) and sack codes, such as A, B, C, etc., which are used to indicate that this sack should received mailpiece packages bearing a similar code on the face mailpiece or label.

FIGS. 3, 10, and 10A show a count report. 36. The count report 36 contains a list showing endorsement and count of each package and count of each sack of the mailing. The report contains for each mailpiece package the sack code, sack type, right end of the endorsement line (the rest of the line is all asterisks), the count of mailpieces in the package, and the database record of the first record of the package group. Also listed is the total mailpiece count in each sack, and the total mailpiece count in all sacks.

Labels in FIG. 4 contain information used by the person affixing labels 28C 28B 28A by hand or operating a labelling machine to know when to make a package 60, and which mail sack 64 to place that package 60 into. Labelling by hand, the person begins at the tail end of label strip 66 backing, peels off and affixes label 28C onto mailpiece 59, and places it face up. He/she peels and affixes label 28B onto another mailpiece 59 and places it face up upon the first one, making a pile. He/she continues until he/she has affixed label 28A with a string of asterisks 50 on the top line. This string of asterisks 50 is a flag to tell him/her he/she should now place rubber bands 40 around the collection of mailpieces 59 in the pile to make a package 60. If labelling is by machine, the operator may begin at whichever end of label strip 66 is necessary depending on the way the machine handles mailpieces 59. Some machines permit pre-setting a count, and the machine will affix that many labels 28A 28B and 28C then pause. It is for this reason that the package count 54 of mailpieces 59 is printed on the top label 28A and bottom label 28C of each package group. The package count 54 figures are easily omitted upon request. Also shown in FIG. 4 is a logical cutting location 58 where label strip 66 may be divided into two or more label strips 66.

After making a package 60, as shown in FIG. 5, the person must note sack code 56, consisting of one or two upper case alpha letters at the right end of the second line on label 28A. The person then selects the mail sack 64 with an identical sack code 56 on the sack label 62, as shown in FIG. 6, and places package 60 into it. Labelling is resumed, other packages 60 are assembled, and placed into coded sacks 64 in like manner until all mailpieces 59 have been assembled into packages 60 and placed into sacks 64.

Figure 7:
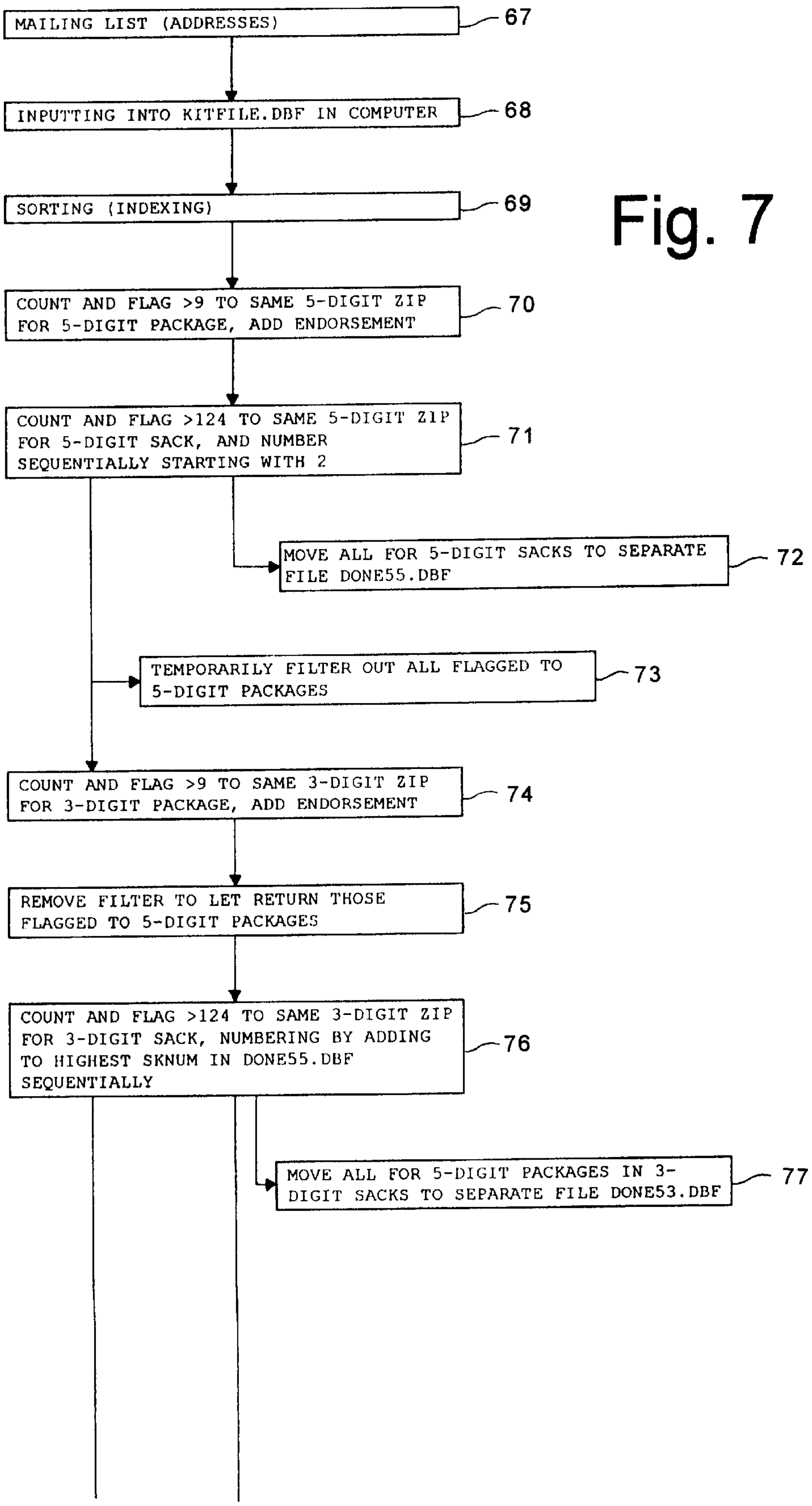
FIGS. 7 and 7A shows front and reverse of USPS Form 3602 (mailing statement) which must be filled out and presented to postal employees with each bulk mailing, as copied from an instruction booklet.
Figure 7A:
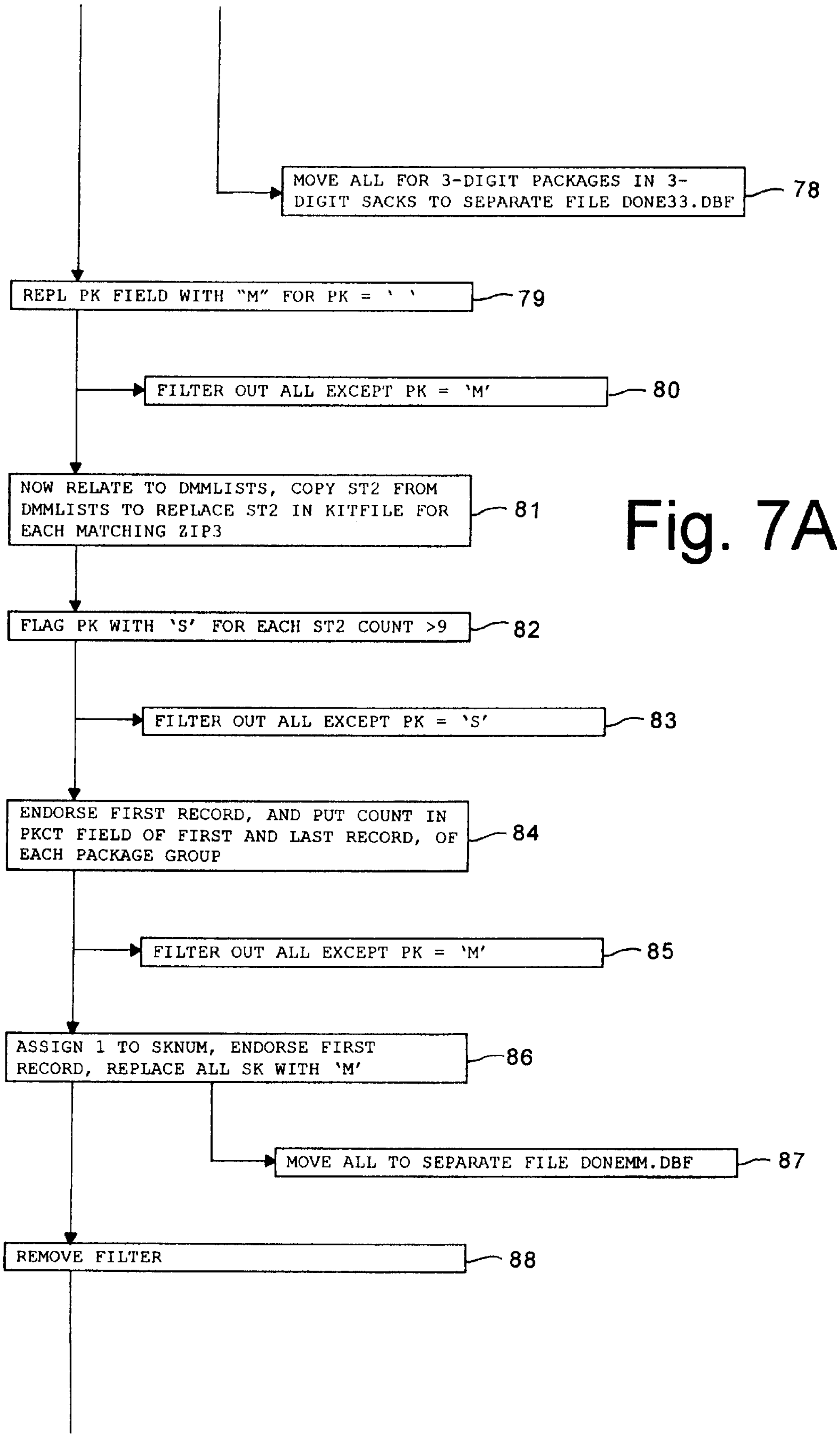
Figure 7B:
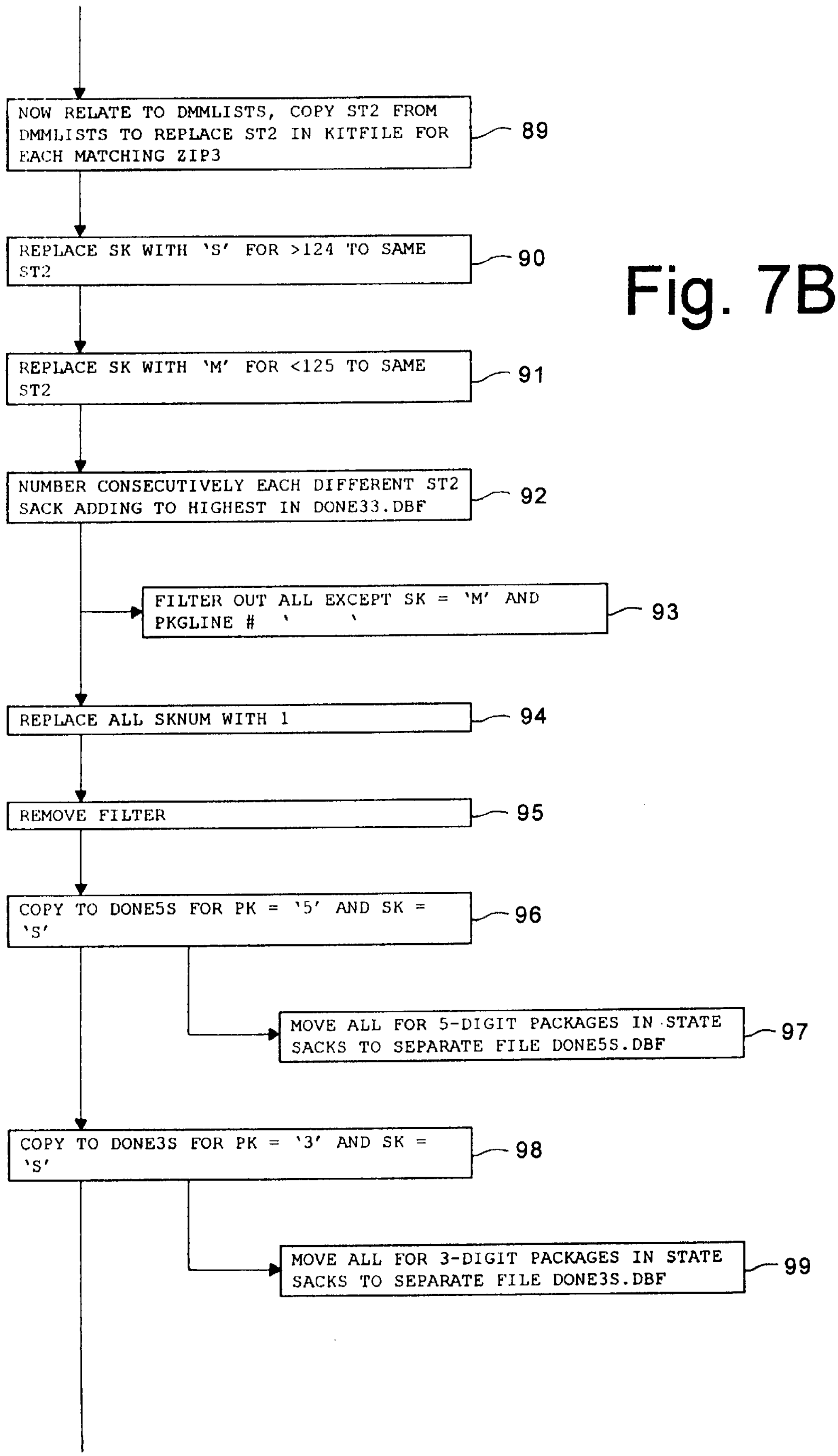
Figure 7C:
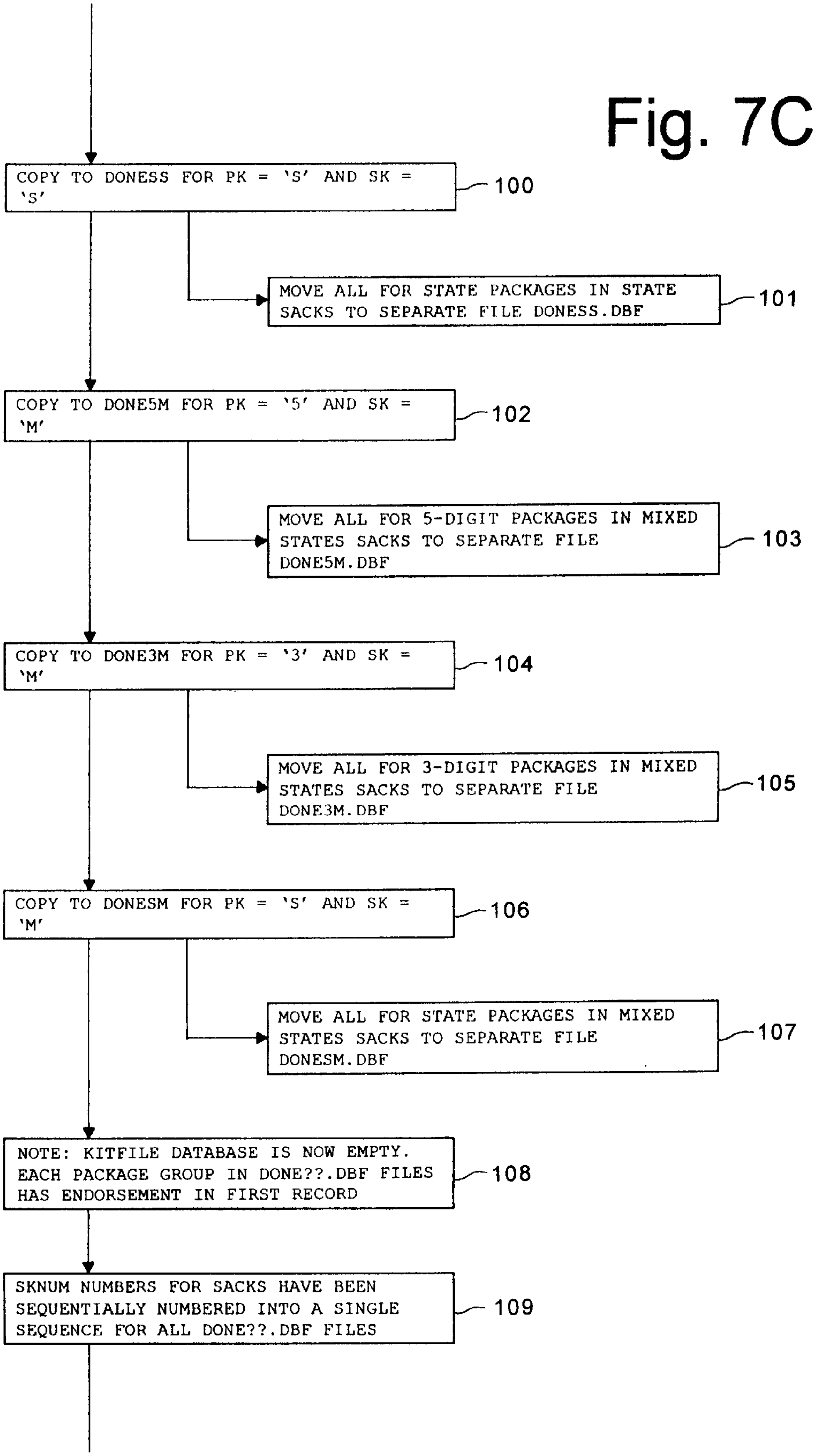
Figure 7D:
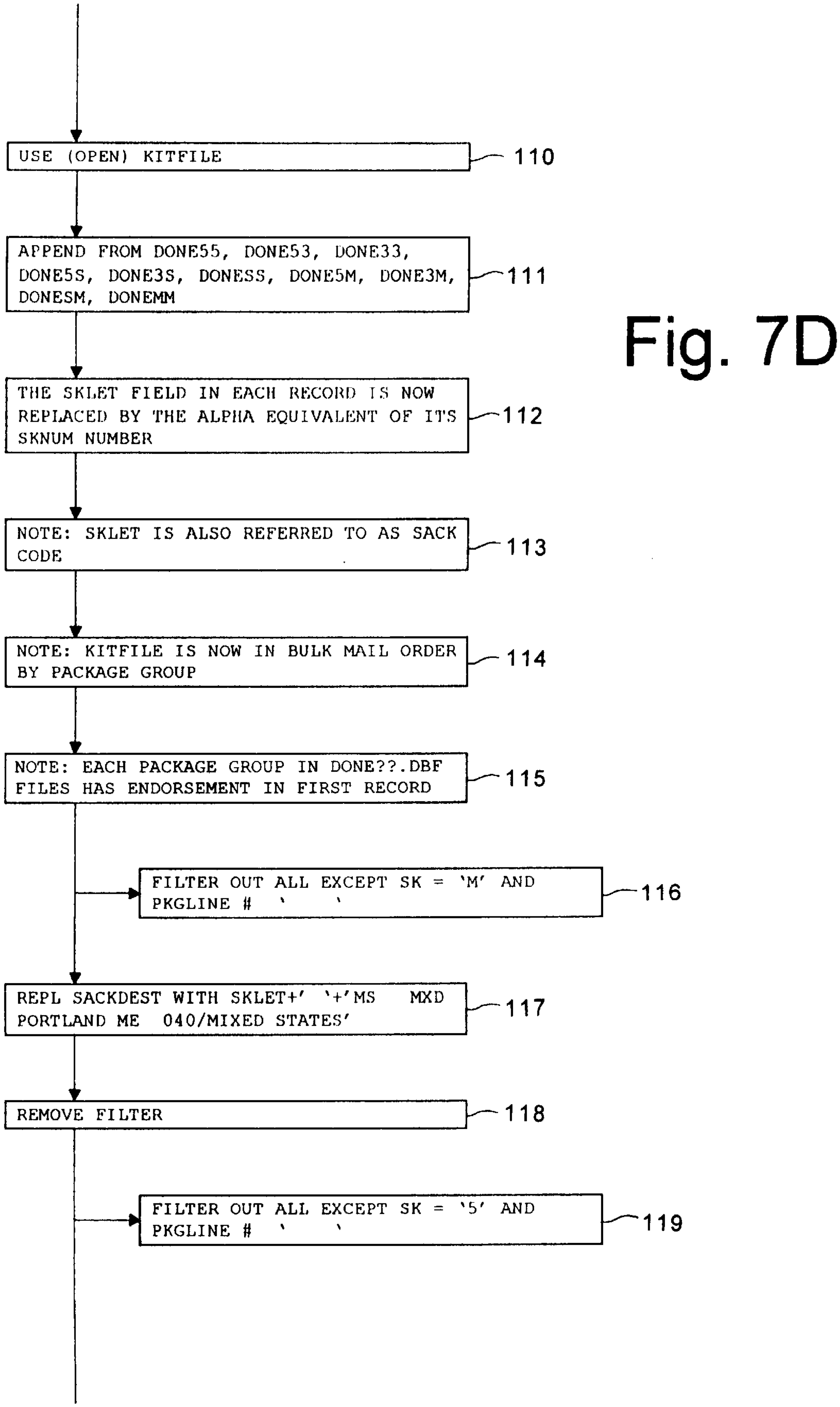
Figure 7E:
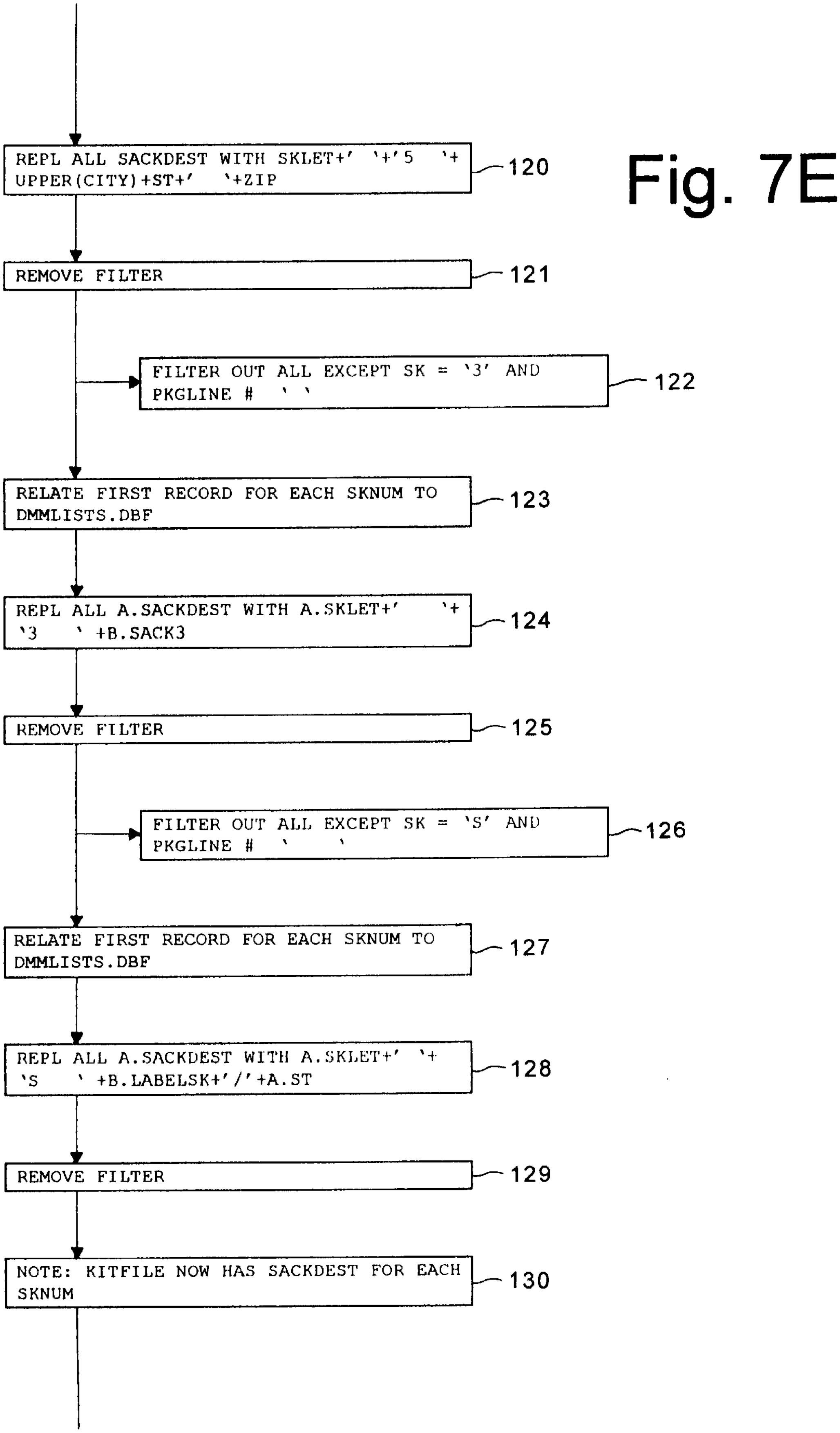
Figure 7F:
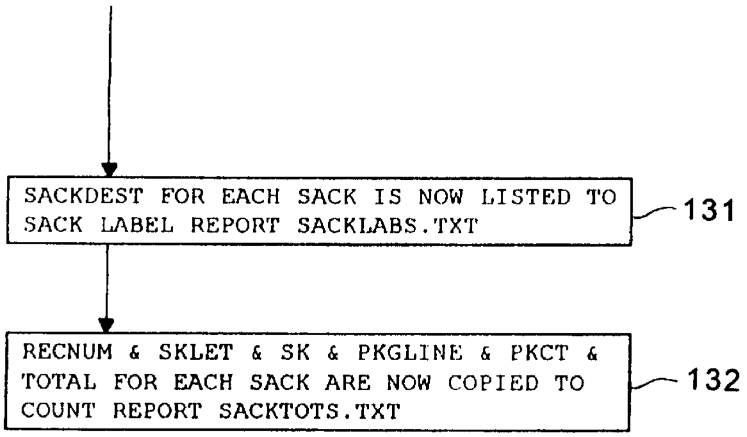

USPS form 3602, mailing statement 38, shown in FIGS. 7 and 7B, which postal regulations require to be filled out and presented to the post office with each bulk mailing, is prepared by an experienced person using report 36 produced by computer 24 and printed on printer+paper supply 26B, which shows the counts of mailpieces in each package 60 and each sack 64.

FIGS. 8 thru 8F is a flow chart showing the detailed operation of the computer program as found in the microfiche submitted with the original application, which produces files which can he used to print addresses on mailpieces or labels for a bulk mailing, and also produces a sack label report. and count report for the same mailing.

FIGS. 9, 10, and 10A are described in the detailed description of FIG. 3.

From the description above, a number of advantages of my bulk mail preparation system become evident:

Address file 20 may be accepted in many forms, such as floppy disk 22, hard copy, via modem, fax and OCR, etc.

The only task in the entire process that requires a person with special mailing knowledge is calculating the postage and the filling out of USPS form 3602 38 (mailing statement). Postal regulations require this form to be filled out by the mailer and presented when the mail is requested to be accepted as bulk mail. This single task could be learned rather easily without learning the entire mailing process. In fact, if the person presenting the mail for acceptance in the bulk mail department showed sack label report 36 listing all the pertinent information to a postal employee, the employee could assist or advise in the correct filling out of the form.

The computer program performs most of the work requiring mental effort or special knowledge. It puts information into the database which is then printed on mailing labels 28A 28B 28C (or envelopes). This information eliminates the need for the person who will affix mailing labels 28C 28B 28A and assemble packages 60 to count or sort mailpieces 59. As labels 28C 28B 28A are being affixed, a flag (string of asterisks 50) signals when package 60 should be assembled, and sack code 56 visible on top label 28A of package 60 shows which sack 64 that package 60 should be placed into.

A label strip 66 of mailing labels 28A 28B 28C can be divided by cutting above any or all top labels 28A so packages 60 may be assembled by different persons simultaneously. This is especially suitable for nonprofit organizations which have groups of volunteers assist them with preparing the mail, or for businesses which have several persons in different locations prepare the mail. It also could be useful therapy, with a single staff person in charge of a group of mentally handicapped persons, giving each member of the group one package group at a time to work with, and quickly examining packages 60 upon their completion.

All the steps of bulk mailing which are difficult to all but the very experienced are taken care of in the preparation of the kit—the sorting, the counting, knowing what goes into a particular package 60, knowing what must be displayed on each sack label 62, knowing which package 60 must go into which sack 64, knowing how to calculate the postage categories and amounts, and inspiring confidence in those preparing the mail that they will succeed without problems.

All the minor details involved in bulk mailing are also taken care of-providing correctly labeled mail sacks 64, thus saving a trip to the post office to obtain them, then inserting the sack labels 62, providing rubber bands 42 to make packages 60, providing a completed USPS form 3602 38 ready to date and sign, and inspiring confidence that all the details have been taken care of.

Operation-FIGS. 1–6

An Address file 20 is inputted into a computer 24 by any means. Computer 24 manipulates address file 20, counting and sorting it to bulk mail sequence by package 60. Computer 24 adds package count 54 to records for top label 28A and bottom label 28C of each package 60 group. It adds endorsement lines consisting of a string of asterisks 50 and an endorsement 52 to records of top label 28A of each package 60 group. It takes count into consideration and relates the mail list zip codes to zip codes in a file copied from the Domestic Mail Manual to determine what should be displayed on the top line of sack labels 62, and places this information plus sack code 56 into the top or first record of each package 60 group.

Computer 24 also produces sack label report 32, and it is printed on printer+paper supply 26B. Sack label report 32 shows what must be displayed on the top line and right hand end of the second line of each sack label, and shows what the sack code indicia for each label is. This report is used to select the correct sack label 62 from existing stock or prepare a sack label by copying information from sack label report 32 to blank sack labels. Sack code 56 is manually copied from the report to each sack label 62. Sack labels 62 are then inserted into the sack holders of mail sacks 64, which were previously provided by the post office and kept on hand. The mail sacks 64 are then included in the bulk mail kit 48. If shipping costs were of concern, coded sack labels 62 could be included in bulk mail kit 48, and mail sacks 64 could be obtained from a local post office where the kit is used.

Computer 24 also produces count report 36, and it is printed on printer+paper supply 26B. Count report 36 lists counts of mailpieces 59 in each package 60, and in each mail sack 64. Count report 36 is used by a person with knowledge of or access to the Domestic Mail Manual to determine postage categories for each sack, write the correct numbers in each category on USPS form 3602 38, and calculate the correct postage. The rest of USPS form 3602 38 may also be filled out, usually leaving the date and signature to be filled in later by another person. USPS form 3602 38 is included in bulk mail kit 48.

The person operating computer 24 uses printer+blank label supply 26A to print mailing labels 28A 28B 28C in bulk mail sequence by package 60, with a string of asterisks 50 to act as a flag along with endorsement 52 as the top line on the top label 28A of each package 60 group. Sack code 56 is printed on top label 28A of each package 60 group. Package count 54 is printed on top label 28A and bottom label 28C of each package 60 group. Strip 62 of printed mailing labels 28A 28B 28C are included in bulk mail kit 48.

The person assembling bulk mail kit 48 looks at count report 36 and counts or estimates the number of packages 60 in the listing, then gathers the necessary quanity of rubber bands 42 and includes them in bulk mail kit 48. He/she also includes instructions sheet 46 in bulk mail kit 48.

Bulk mail kit 48 is now ready for shipping or use.

SUMMARY, RAMIFICATIONS, AND SCOPE

Accordingly, the reader will see that by using the product of this method, the bulk mail kit, an average person with no mail preparation experience can easily and correctly prepare mailpieces for acceptance by the post office as bulk mail. Furthermore, the method has additional advantages in that ○ Using the bulk mail kit will enable even veteran mailers to perform a bulk nailing in less time and with less effort and less chance of error than previously;

○ The method uses fewer mailing labels than prior methods, and wastes none;

○ Using the bulk mail kit saves considerable time and effort by eliminating the use of "D", "3", "S", or "MS" stickers on each package;

○ Using the bulk mail kit reduces the chances of errors in assembly packages and placing packages into correct mail sacks, and in labelling sacks to the correct destination;

○ Using the bulk mail kit enables bulk mail preparation to be easily divided among a group of persons who may work simultaneously without increasing the likelihood of errors being made in the operation;

○ Using the bulk mail kit greatly reduces the number of decisions that must be made in bulk mail preparation—in fact the number is reduced to practically zero;

○ Using the bulk mail kit reduces the concentration and attentiveness to business so much that preparers may introduce reasonable amounts of banter or fellowship into the operation and thereby make the work more tolerable or even enjoyable;

Although the description above contains any specificities, these should not be construed as limiting the scope of the invention but as merely providing illustrations of some of the presently preferred embodiments of this invention. For example, the system could be used with mail trays rather than sacks, or with an optional SCF sack to obtain a postage discount when deposited at a Bulk Mail Acceptance Unit, or with different classes or categories of mail, or with operations that have nothing to do with mail, such as packaging and casing products manufactured on an assembly line, or routing parts to various assembly lines, etc.

Thus the scope of the invention should be determined by the appended claims and their legal equivalents, rather than by the examples given.

What is clamed is:

1. A method of producing a bulk mail sorted sequence file of address entries and a mail sack label report, utilizing a computer and a printer, comprising the steps of:

(a) inputting at least L random or assorted addresses into a file in the computer, each address entry having state, and zip code designations;

(b) automatically sorting all address entries in the address file by zip code and by partial zip code designations;

(c) automatically separating omit all groups of address entries having X or more address entries with the same zip cod designation, and assigning information to accompany selected address entries;

(d) automatically separating out any remaining groups of address entries, after step (c), having Y or more address entries with the same partial zip code designation, and assigning information to accompany selected address entries;

(e) automatically separating out any remaining groups of address entries, after step (d), having Z or more address entries with certain partial zip codes designated by the post office for a state package or sack, and assigning information to accompany selected address entries;

(f) automatically assigning information to accompany all additional address entries remaining after step (e);

(g) automatically producing, with address entries in hulk mail order by package group, a file including endorsement lines which can cause some addressed mailpieces or labels to perform two specific different functions: one function being to eliminate the necessity of affixing a sticker such as "D", "3", "S", or "Ms" to the face mailpiece of each mailpiece group, and the other function being to indicate the face mailpiece label or mailpiece of each mailpiece group by a mere glance at a strip of labels or each mailpiece.

2. A method as recited in claim 1 comprising the further step of automatically controlling the printer with the computer to print addresses on mailpieces or address labels including endorsement lines which can cause some addressed mailpieces or labels to perform two specific different functions as recited in step (g) above.

3. A method as recited in claim 1 wherein L, X, Y, and Z are equal to the minimum quantities which will meet USPS bulk mail requirements.

4. A method as recited in claim 3 wherein the steps of flagging, coding, and endorsing address groups permit easy dividing of printed labels by package groups, allowing a supervisor to give a supply of mailpieces and one package group of printed labels to an English language illiterate individual capable of affixing labels sequentially and piling the labeled mailpieces, until they have no more labels to affix, and then take the pile to wrap into a package.

5. A method as recited in claim 4 wherein sack code symbols are assigned to face mailpieces and mail sack labels, enabling even an English language illiterate individual who can match symbols, such as letters of the alphabet, to place mailpiece packages into sacks whose labels have matching symbols.

6. A method of preparing bulk mailing comprising the steps of:

(a) preparing and printing address labels sorted to bulk mail order by package group including address labels bearing endorsement lines which can cause the labels to perform two specific different functions: one function being to eliminate the necessity of affixing a sticker such as "D", "3", "S", or "MS" to the face mailpiece of each mailpiece group, and the other function being to indicate the face mailpiece label of each mailpiece group by a mere glance at the strip of labels;

(b) preparing mail sack labels with correct routing information plus codes indicating into which sack the code-matching packages must he placed;

(c) inserting correctly prepared and coded mail sack labels into mail sack label holders attached to mail sacks;

(d) partially filling out a postal mailing statement with mailpiece quantities in correct categories and calculated postage for then mailing;

(e) affixing address labels to mailpieces in sequence;

(f) encircling the package groups with suitable meand to make packages;

(g) noting the code on the face mailpiece label of each package, which indicates into which mail sack that package must be placed;

(h) finding the mail sack label with code identical to that on the package and placing the package into the attached mail sack;

(i) continuing in like manner until all mailpieces have been properly made into packages and placed into correctly labeled mail sacks;

(j) closing all mail sacks and transporting to post office specified on mailing permit;

(k) completing the filling out of the postal mailing statement by entering name, address, permit number, date, signature, and whatever else is needed;

(l) paying postage and having the mailing accepted as bulk mail.

7. A method of preparing a bulk mailing comprising the steps of:

(a) preparing and printing address labels sorted to bulk mail order by package groups meeting postal regulations, including addressed labels bearing endorsement lines which can cause the labels to perform two specific different functions: one function being to eliminate the necessity of affixing a color-coded sticker such as "D", "3", "S", or "MS" to the face mailpiece of each mailpiece group, and the other function being to indicate the face mailpiece label of each mailpiece group by a mere glance at each label;

(b) preparing mail sack labels with correct routing information and sack code symbols which must be matched by the sack code symbols on the face mailpiece of each package which must be placed therein;

(c) inserting correctly prepared and coded mail sack labels into mail sack label holders attached to mail sacks;

(d) partially filling out a postal mailing statement with mailpiece quantities in correct categories and calculated postage for the mailing;

(e) affixing address labels to mailpieces in sequence until an address label having a string of asterisks is noticed and recognized while being affixed, the string of asterisks indicating a face mailpiece address and the completion of a package group;

(f) encircling the package group with suitable means to make a package;

(g) glancing at the designated spot on the face mailpiece label and noting the sack code symbol of that package;

(h) glancing at the designated spot on each mail sack label until finding an identical symbol on the label of a sack, and placing the package into that sack;

(i) continuing in like manner until all mailpieces have been properly made into packages and placed into correctly labeled mail sacks, steps (e) through (i) needing no reading or counting;

(j) having a literate person complete the filling out of the postal mailing statement, including entering the date and signing the statement;

(k) transporting mail sacks and paperwork to a post office specified on a mailing permit;

(l) paying postage and having the mailing accepted as bulk mail.

8. A method as recited in claim 7 wherein (d) comprises partially filling out a postal mailing statement with mailpiece quantities in correct categories and calculated postage for the mailing, obtaining and delivering a supply of mailpieces, along with addressed labels, labelled mail sacks, and oral instructions to an English language illiterate person explaining how to affix the labels, including pointing out the string of asterisks, and explaining that the string of asterisks should be the only concern in determining the face mailpiece and the mailpiece package group, and instructing the illiterate person how to perform the remaining steps, then when he has demonstrated that he understands all the instructions, directing him to perform the remaining steps.

9. A method as recited in claim 7 wherein (e) comprises using a labelling machine to affix the address labels in sequence to mailpieces until an affixed label having a string of asterisks is seen by the preparer, the string of asterisks indicating a face mailpiece label, and that the package group is now ready to be removed and encircled.

10. A method as recited in claim 7 wherein (e) comprises using a labelling machine to affix the address labels in sequence to mailpieces until an affixed label having a string of asterisks is seen by the preparer, the string of asterisks indicating the face mailpiece label of the next package group, and that the just previously labelled package group is now ready to be removed and encircled.

11. A method of preparing a bulk mailing comprising the steps of:

(a) preparing addresses sorted to bulk mail order by mailpiece package groups meeting postal regulations, including addresses bearing endorsement lines which can cause the addressed mailpieces to perform two specific different functions: one function being to eliminate the necessity of affixing a color-coded sticker such as "D", "3", "S", or "MS" to the face mailpiece of each mailpiece group, and the other function being to indicate the face mailpiece address of each mailpiece package group by a mere glance at the faces of mailpieces;

(b) preparing mail sack labels with correct routing information, and with code symbols which must be matched by the sack code symbols on the face mailpiece of each package group when placing packages into sacks;

(c) inserting correctly prepared and coded mail sack labels into mail sack label holders attached to mail sacks;

(d) partially filling out a postal mailing statement with mailpiece quantities in correct categories and calculated postage for the mailing;

(e) printing addresses in sequence onto mailpieces, permitting an accumulation of addressed mailpieces until an address with a string of asterisks is noticed and recognized by a glance of the observing packager, the string of asterisks indicating a face mailpiece address, and the completion of address printing for a package group, and being the signal for the preparer to remove the package group for banding;

(f) encircling the package group with suitable means to make a package;

(g) glancing at the designated spot on the face mailpiece, and noting the sack code symbol of the package;

(h) glancing at the designated spot on each sack's label until finding an identical symbol on the label of a sack, and placing the package into that sack;

(i) continuing in like manner until all mailpiece package groups have been properly made into packages and placed into correctly labeled mail sacks, and the sacks closed;

(j) having a literate person complete the filling out of the postal mailing statement, including entering the date and signing the statement;

(k) transporting the closed sacks and paperwork to a post office specified on a mailing permit;

(l) paying postage and having the mailing accepted as bulk mail.

12. A method as recited in claim 66 wherein in (e) an English language illiterate person is the observing packager after having received oral instructions explaining how to detect the face mailpiece of each package group by recognizing the string of asterisks, and explaining that the string of asterisks should be the only concern in determining the face mailpiece and the mailpiece package group, and further explaining how to perform the remaining steps up to and including step (i), then when he had demonstrated that he could perform the remaining steps, he had been directed to perform those steps repeatedly until all mailpiece packages are in sacks, all without the need for reading or counting by the observing packager.

* * * * *

UNITED STATES PATENT AND TRADEMARK OFFICE

CERTIFICATE OF CORRECTION

PATENT NO. : 5,841,658
DATED : Nov. 24, 1998
INVENTOR(S) : Paul W. Bouchard

It is certified that error appears in the above-identified patent and that said Letters Patent is hereby corrected as shown below:

On the title page, in Item [76], after Inventor: change "R.R. 2 Box 169, Orrington, Me. 04474" to "38 Settlers Way, Orrington, Me. 04474"

On the title page, in the right column, below the abstract, change "17 Drawing Sheets" to "15 Drawing Sheets" (Figs. 10 and 10A in the drawings are duplicates of Figs. 9 and 9A, and must be deleted.)

Sheet 16 of 17: Delete Sheet 16 of 17 as it is a duplicate of Sheet 14 of 17.

Sheet 17 of 17: Delete Sheet 17 of 17 as it is a duplicate of Sheet 15 of 17.

Col. 2, line 18: Change "Tailpieces" to "mailpieces"
Col. 2, line 38: Change "appear o sack" to "appear on sack"
Col. 2, line 40: Change "th e" to "the"
Col. 2, line 45: Insert " in" after the word "information"
Col. 2, line 55: Change "N.J." to "NJ"
Col. 2, line 57: Change "Mass." To "MA"
Col. 2, line 58: Change " SAC " to " SACK "
Col. 2, line 58: Change "DETERK-" TO "DETERM-"
Col. 5, line 31: Change "m-ail" to "mail"
Col. 8, line 28: Delete the word "hand".

UNITED STATES PATENT AND TRADEMARK OFFICE

CERTIFICATE OF CORRECTION

PATENT NO. : 5,841,658
DATED : Nov. 24, 1998
INVENTOR(S) : Paul W. Bouchard

It is certified that error appears in the above-identified patent and that said Letters Patent is hereby corrected as shown below:

Column 9, line 11 & 12: Delete "I have designated it as FIG. 1." (It is no longer FIG. 1)
Column 9, lines 11 thru 17: Replace lines 11 thru 17 with "NOTE: A microfiche of the computer program which will produce files of two reports and prepare the address file for printing is included as an appendix."
Column 9, line 18: Change "FIG. 2" to "FIG. 1"
Column 9, line 21: Delete entire line "FIG. 2A is a reduced version of FIG. 2 for the Gazzette."
Column 9, line 22: Change "FIG. 3" to "FIG. 2"
Column 9, line 25: Change "FIG. 4" to "FIG. 3"
Column 9, line 31: Change "FIG. 5" to "FIG. 4"
Column 9, line 36: Change "FIG. 6" to "FIG. 5"
Column 9, line 38: Change "FIGS. 7 and 7A" to "FIGS. 6 and 6A"
Column 9, line 42: Change "8, 8A, 8B, 8C, 8D, 8E, 8F" TO "7, 7A, 7B, 7C, 7D, 7E, 7F"
Column 9, line 47: Change "FIG. 9" to "FIG. 8"
Column 9, line 50: Change "10 and 10A" to "9 and 9A"
Column 11, lines 36 thru 39: Delete these 4 lines.
Column 11, line 41: Change "FIG. 2" to "FIG. 1"
Column 12, line 21: Change "3 and 9" to "2 and 8"
Column 12, line 40: Change "3, 10, and 10A" to "2, 9, and 9A"
Column 12, line 49: Change "FIG. 4" to "FIG. 3"

UNITED STATES PATENT AND TRADEMARK OFFICE
CERTIFICATE OF CORRECTION

PATENT NO. : 5,841,658
DATED : Nov. 24, 1998
INVENTOR(S) : Paul W. Bouchard

It is certified that error appears in the above-identified patent and that said Letters Patent is hereby corrected as shown below:

Column 13, line 3: Change "4 is a" to "3 is a"
Column 13, line 5: Change "FIG. 5," to "FIG. 4,"
Column 13, line 9: Change "Fig. 6," to "FIG. 5,"
Column 13, line 14: Change "7 and 7B," to "6 and 6B,"
Column 13, line 20: Change "8 thru 8F" to "7 thru 7F"
Column 13, line 26: Change "9, 10, and 10A" to "8, 9, and 9A"
Column 13, line 27: Change "3." To "2."
Column 14, line 14: Change "1-6" to 1-6A"
Column 15, line 33: Change "any" to "many"
Column 19, line 1: Change "66" to "11"

Column 14, lines 11,49,50, and 52, reference numeral 38 should be in bold type.

Signed and Sealed this

Sixth Day of July, 1999

Attest:

Q. TODD DICKINSON

Attesting Officer

*Acting Commissioner of Patents and Trademarks*